(12) United States Patent
Kato

(10) Patent No.: US 12,146,767 B2
(45) Date of Patent: Nov. 19, 2024

(54) INFORMATION PROCESSING DEVICE, CONTROL METHOD, PROGRAM AND STORAGE MEDIUM

(71) Applicant: PIONEER CORPORATION, Tokyo (JP)

(72) Inventor: Masahiro Kato, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 17/781,323

(22) PCT Filed: Dec. 1, 2020

(86) PCT No.: PCT/JP2020/044665
§ 371 (c)(1),
(2) Date: May 31, 2022

(87) PCT Pub. No.: WO2021/112078
PCT Pub. Date: Jun. 10, 2021

(65) Prior Publication Data
US 2023/0003521 A1    Jan. 5, 2023

(30) Foreign Application Priority Data
Dec. 2, 2019 (JP) .................. 2019-218034

(51) Int. Cl.
*G01C 9/06* (2006.01)
*G01C 21/30* (2006.01)
*G08G 1/0969* (2006.01)

(52) U.S. Cl.
CPC ............... *G01C 9/06* (2013.01); *G01C 21/30* (2013.01); *G01C 2009/066* (2013.01); *G08G 1/0969* (2013.01)

(58) Field of Classification Search
CPC ..................................................... G01C 21/30
See application file for complete search history.

(56) References Cited

U.S. PATENT DOCUMENTS

| | | | |
|---|---|---|---|
| 2014/0309841 A1 | 10/2014 | Hara et al. | |
| 2016/0010988 A1* | 1/2016 | Bando ....................... | B60P 1/04 701/34.4 |

(Continued)

FOREIGN PATENT DOCUMENTS

| | | |
|---|---|---|
| JP | 2014-130404 A | 7/2014 |
| JP | 2023-054314 A | 4/2023 |

(Continued)

OTHER PUBLICATIONS

Patent Cooperation Treaty, International Search Report, Application No. PCT/JP2020/044665, dated Jan. 15, 2021, in 4 pages.

(Continued)

*Primary Examiner* — Imran K Mustafa
(74) *Attorney, Agent, or Firm* — PROCOPIO, CORY, HARGREAVES & SAVITCH LLP

(57) ABSTRACT

The control unit 15 of the in-vehicle device 1 is configured to extract, from voxel data VD that is position information of an object for each of unit areas (voxels) into which a space is divided, the voxel data VD of plural voxels located at or around an own vehicle. Then, the control unit 15 is configured to calculate a normal vector of an approximate plane calculated based on the extracted voxel data VD of the plural voxels. Then, the control unit 15 is configured to calculate at least one of a pitch angle of the own vehicle or a roll angle of the own vehicle based on an orientation of the own vehicle and the normal vector.

11 Claims, 14 Drawing Sheets

REFERENCE POSITION: HEIGHT

(56) References Cited

U.S. PATENT DOCUMENTS

| | | | |
|---|---|---|---|
| 2019/0135293 A1* | 5/2019 | Kotteri | B60W 40/076 |
| 2020/0225678 A1* | 7/2020 | Lee | G05D 1/0223 |
| 2020/0271454 A1 | 8/2020 | Kato | |
| 2021/0199463 A1* | 7/2021 | Kitahara | G01C 21/3815 |
| 2022/0082390 A1* | 3/2022 | Kameoka | G01S 19/49 |
| 2023/0010175 A1 | 1/2023 | Kato | |

FOREIGN PATENT DOCUMENTS

| | | |
|---|---|---|
| WO | 2013/076829 A1 | 4/2015 |
| WO | 2015/151681 A1 | 10/2015 |
| WO | 2018/221453 A1 | 12/2018 |

OTHER PUBLICATIONS

Japanese Office Action issued on the corresponding Japanese Patent Appln. No. 2023-027424 on Oct. 24, 2023, in 2 pages.
European Patent Office, Extended European Search Report, Application No. 20895318.2, dated Dec. 4, 2023, in 8 pages.

* cited by examiner

INFORMATION PROCESSING DEVICE, CONTROL METHOD, PROGRAM AND STORAGE MEDIUM

CROSS-REFERENCE TO RELATED APPLICATIONS

This application is US National Stage of International Patent Application PCT/JP2020/044665, filed Dec. 1, 2020, which claims benefit of priority from Japanese Patent Application JP2019-218034, filed Dec. 2, 2019, the contents of both of which are incorporated herein by reference.

TECHNICAL FIELD

The present invention relates to a technique for estimating the posture of a vehicle.

BACKGROUND ART

Conventionally, there is known a technique for estimating the self-position of a vehicle by collating (matching) the shape data of a peripheral object measured by a measuring device such as a laser scanner with the map information in which the shape of the peripheral object is stored in advance. For example, Patent Literature 1 discloses an autonomous mobile system configured to determine whether a detected object situated in each voxel that is obtained by dividing the space by a predetermined rule is a stationary object or a moving body and to perform matching between map information and measurement data for voxels in which stationary objects are present. Further, Patent Literature 2 discloses a scan matching method for performing the own vehicle position estimation by matching (verification) between point cloud data outputted by lidar and voxel data which includes the mean vector and the covariance matrix of stationary object(s) for each voxel.

PRIOR ART DOCUMENTS

Patent Literature

Patent Literature 1: WO2013/076829
Patent Literature 2: WO2018/221453

SUMMARY

Problem to be Solved by the Invention

Generally, the vehicle is constrained on the road surface, and changes in the pitch angle, roll angle, and vertical direction of the vehicle are negligibly small, though there is some fluctuation by the suspension. Therefore, in the general self-position estimation of the vehicle by scan matching, the planar position and orientation of the vehicle are set as parameters to be estimated. On the other hand, when the vehicle is traveling on a slope (hill) having a large gradient or a road with a cross slope, simply by estimating the planar position and orientation of the vehicle, it is impossible to cope with changes in pitch angle and roll angle, which leads to incorrect association between voxels to be matched and the measurement data or no association therebetween. In contrast, in order to cope with the changes in pitch angle and/or roll angle, when the pitch angle and/or the roll angle is added as a part of the estimation parameters of self-position estimation, the calculation load increases due to an increase in the number of the estimated parameters, resulting in an issue that the self-position estimation to be done in the required time cycle does not stably terminate. Although there is a method for determining the pitch angle and roll angle of the vehicle from the data outputted by an IMU (Inertial Measurement Unit), there is also an issue that the pitch angle and the roll angle cannot be accurately calculated due to the sensitivity error and offset in a common IMU.

The present invention has been made in order to solve the above issues, and it is an object of the present invention to provide an information processing device capable of suitably estimating the posture of the vehicle.

Means for Solving the Problem

One invention is an information processing device including: an extraction unit configured to extract, from position information of an object for each of unit areas into which a space is divided, the position information of plural unit areas located at or around a moving body; a normal vector calculation unit configured to calculate a normal vector of an approximate plane calculated based on the extracted position information of the plural unit areas; and an angle calculation unit configured to calculate at least one of a pitch angle of the moving body or a roll angle of the moving body based on an orientation of the moving body and the normal vector.

Another invention is a control method executed by an information processing device, the control method including: extracting, from position information of an object for each of unit areas into which a space is divided, the position information of plural unit areas located at or around a moving body; calculating a normal vector of an approximate plane calculated based on the extracted position information of the plural unit areas; and calculating at least one of a pitch angle of the moving body or a roll angle of the moving body based on an orientation of the moving body and the normal vector.

Still another invention is a program executed by a computer, the program causing the computer to function as: an extraction unit configured to extract, from position information of an object for each of unit areas into which a space is divided, the position information of plural unit areas located at or around a moving body; a normal vector calculation unit configured to calculate a normal vector of an approximate plane calculated based on the extracted position information of the plural unit areas; and an angle calculation unit configured to calculate at least one of a pitch angle of the moving body or a roll angle of the moving body based on an orientation of the moving body and the normal vector.

DETAILED DESCRIPTION OF PREFERRED EMBODIMENTS

Figure 1:
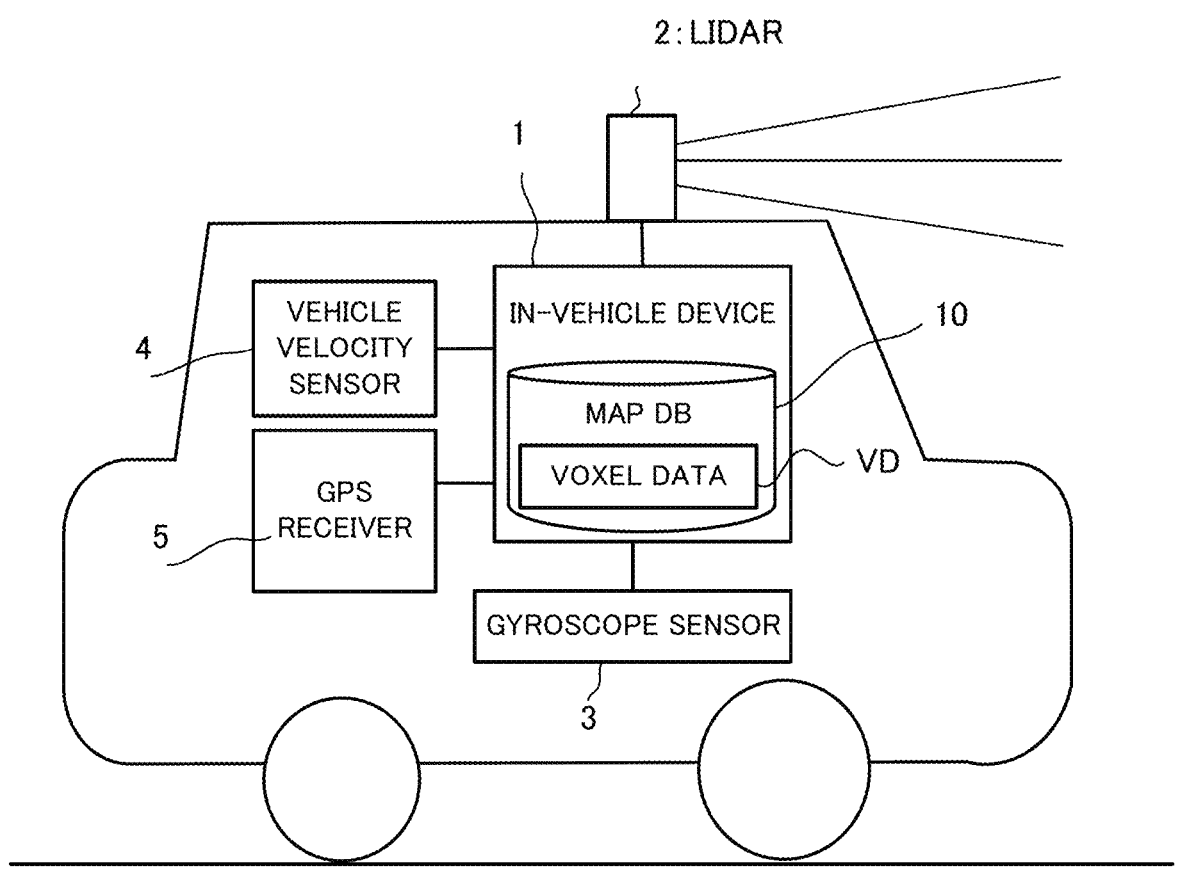
FIG. 1 is a schematic configuration diagram of a driving support system.

According to a preferred embodiment of the present invention, there is provided an information processing device including: an extraction unit configured to extract, from position information of an object for each of unit areas into which a space is divided, the position information of plural unit areas located at or around a moving body; a normal vector calculation unit configured to calculate a normal vector of an approximate plane calculated based on the extracted position information of the plural unit areas; and an angle calculation unit configured to calculate at least one of a pitch angle of the moving body or a roll angle of the moving body based on an orientation of the moving body and the normal vector.

Generally, since a moving body travels on a road surface, there is a road surface in the vicinity of the moving body and it is inferred that the road surface is included in a plurality of unit areas at or around the moving body. Further, the moving body is constrained to the road surface, the pitch angle and the roll angle of the moving body depend on the inclination of the road surface. In view of the above, in this embodiment, the information processing device calculates a normal vector of a plane, which approximates the road surface, based on position information, which is presumed to be the position information of the road surface, of an object existing in plural unit areas. Thereby, the information processing device can suitably calculate at least one of the pitch angle or the roll angle of the moving body, based on the relation between the calculated normal vector and the orientation of the moving body.

In one mode of the information processing device, the angle calculation unit calculates the pitch angle based on an inner product of the normal vector and a vector indicative of the orientation of a travelling direction of the moving body on a horizontal plane. According to this mode, the information processing device calculates the angle formed between the normal vector of the approximate plane and the traveling direction of the moving body on the horizontal plane, thereby to suitably determine the pitch angle of the moving body.

In another mode of the information processing device, the angle calculation unit calculates the roll angle based on an inner product of the normal vector and a vector indicative of the orientation of a lateral direction of the moving body on a horizontal plane. According to this mode, the information processing device calculates the angle formed between the normal vector of the approximate plane and the lateral direction of the moving body on the horizontal plane, thereby to suitably determine the roll angle of the moving body.

In still another mode of the information processing device, the information processing device further includes a position estimation unit configured to perform position estimation of the moving body through matching for each of the unit areas between the position information of the object and data obtained by a coordinate transformation of measurement data based on at least one of the pitch angle or the roll angle, the measurement data being outputted by a measurement unit mounted on the moving body. In this mode, the information processing device performs the position estimation of the moving body through matching (verification) between the position information of the object and the measurement data outputted by the measuring unit. At this time, the information processing device performs the coordinate transformation of the measurement data based on the calculated pitch angle or roll angle. Thereby, even when the variation in the pitch angle or the roll angle of the vehicle occurs by running on a hill or a road with a high cross slope, the information processing device can perform the matching while accurately associating the unit areas where a target object of measurement is actually present with the measurement data of the target object of measurement.

In still another mode of the information processing device, the position information of the object for each of the unit areas includes information indicative of a mean vector of the position of the object for each of the unit areas, and the normal vector calculation unit calculates the normal vector based on the coordinates of the mean vector for each of the plural unit areas. According to this mode, based on the position information of the object in plural unit areas inferred to be the position information of a road surface on which the moving body is present, the information processing device can suitably calculate the normal vector of the plane approximating the road surface.

In still another mode of the information processing device, the extracting unit extracts the position information corresponding to a first unit area overlapping with the position of the moving body and second unit areas adjacent to the first unit area, the first unit area and the second unit areas being selected from unit areas which have the position information of the object. According to this mode, the information processing device can suitably extract the position information of the object in plural unit areas inferred as the position information of the road surface.

In still another mode of the information processing device, the information processing device further includes a height calculation unit configured to calculates a height of the moving body from a reference position based on the position information of the first unit area and information indicative of a height of the moving body from a road surface. The reference position herein indicates is a position in the absolute coordinate system to be a reference used in map data or the like, and for example, it indicates the position of the altitude 0 m. According to this mode, the information processing device can suitably calculate the height of the moving body from the reference position by using the position information of the object (road surface) in the first unit area in which the moving body is inferred to exist. In some embodiments, if the difference between the height from the reference position calculated based on the position information of the object in the first unit area and the information indicative of the height of the moving body from the road surface and the height from the reference position calculated at the preceding processing time is larger than a predetermined value, height calculation unit may determine the height from the reference position at the current processing time to be the height from the reference position calculated at the preceding processing time. Thereby, when an error occurs in the height of the calculated moving body due to existence of a grade-separated crossing or guard rail in the vicinity, it is possible to suitably suppress recognizing the erroneous height of moving body as the current height of moving body.

In still another mode of the information processing device, the position information is position information of a stationary structure including a road surface, and the extracting unit extracts position information of the road surface included in the plural unit areas from map data including the position information of the object for each of the unit areas. According to this mode, the information processing device suitably extract the position information of the road surface in which the moving body is present from the map data and thereby suitably calculates the normal vector of the approximate plane necessary for calculating the pitch angle or roll angle.

According to another preferred embodiment of the present invention, there is provided a control method executed by an information processing device, the control method including: extracting, from position information of an object for each of unit areas into which a space is divided, the position information of plural unit areas located at or around a moving body; calculating a normal vector of an approximate plane calculated based on the extracted position information of the plural unit areas; and calculating at least one of a pitch angle of the moving body or a roll angle of the moving body based on an orientation of the moving body and the normal vector. By executing the control method, the information processing device can suitably calculate at least one of the pitch angle or the roll angle of the moving body, based on the relation between the normal vector calculated based on position information of unit areas at or around the moving body and the orientation of the moving body.

According to still another preferred embodiment of the present invention, there is provided a program executed by a computer, the program causing the computer to function as: an extraction unit configured to extract, from position information of an object for each of unit areas into which a space is divided, the position information of plural unit areas located at or around a moving body; a normal vector calculation unit configured to calculate a normal vector of an approximate plane calculated based on the extracted position information of the plural unit areas; and an angle calculation unit configured to calculate at least one of a pitch angle of the moving body or a roll angle of the moving body based on an orientation of the moving body and the normal vector. By executing the program, the computer can suitably calculate at least one of the pitch angle or the roll angle of the moving body, based on the relation between the normal vector calculated based on position information of unit areas at or around the moving body and the orientation of the moving body. In some embodiments, the program is stored in a storage medium.

EMBODIMENTS

Hereinafter, preferred embodiments of the present invention are described below with reference to drawings. It is noted that a character with "^" or "−" on its top is expressed in this specification as "A^" or "A−" (where "A" is a character) for convenience.

(1) Outline of Driving Support System

FIG. 1 is a schematic configuration of a driving support system according to the present embodiment. The driving support system includes an in-vehicle device 1 that moves with a vehicle that is a moving body, a lidar (Lidar: Light Detection and Ranging, or Laser Illuminated Detection And Ranging) 2, a gyroscope sensor 3, a vehicle velocity sensor 4, and a GPS receiver 5.

The in-vehicle device 1 is electrically connected to the lidar 2, the gyroscope sensor 3, the vehicle velocity sensor 4, and the GPS receiver 5, and based on these outputs, estimates the position (also referred to as "own vehicle position") of the vehicle equipped with the in-vehicle device 1. Then, the in-vehicle device 1 performs autonomous driving control of the vehicle so as to travel along a route to the set destination based on the estimation result of the own vehicle position. The in-vehicle device 1 stores a map database (DB) 10 including voxel data "VD". The voxel data VD is data in which position information and the like of a stationary structure are recorded for each voxel that is a minimum unit of a three-dimensional space in a cube (normalized grid) shape. The voxel data VD includes data which expresses, by normal distribution with respect to each voxel, measured point cloud data of stationary structures, and is used for scan matching using NDT (Normal Distributions Transform), as will be described later. Further, while estimating the planar position and the yaw angle of the vehicle by NDT scan matching, the in-vehicle device 1 estimates the height position of the vehicle and at least one of the pitch angle or the roll angle, based on the voxel data VD.

The lidar 2 emits pulsed lasers for a predetermined angular range in the horizontal and vertical directions to thereby discretely measure the distance to an external object and then generates three-dimensional point cloud information indicating the position of the object. In this case, the lidar 2 includes: a radiation (emitting) unit for radiating (emitting) a laser beam while changing the irradiation (emitting) direction; a light receiving unit for receiving the reflected light (scattered light) which is the laser beam reflected by the object; and an output unit for outputting scan data based on the light receiving signal outputted by the light receiving unit. The scan data is generated based on the irradiation direction corresponding to the laser beam received by the light receiving unit and the response delay time of the laser beam specified based on the light receiving signal described above. In general, the closer the distance to the object is, the higher the accuracy of the lidar's distance measurement value becomes, and the farther the distance is, the lower the accuracy thereof becomes. The lidar 2, the gyroscope sensor 3, the vehicle velocity sensor 4, the GPS receiver 5, respectively, supply the output data to the in-vehicle device 1. The in-vehicle device 1 is an example of an "information processing device" in the present invention, the lidar 2 is an example of a "measurement unit" in the present invention.

Incidentally, the driving support system, in place of or in addition to having the gyroscope sensor 3, may have an inertial measurement unit (IMU) for measuring the acceleration and angular velocity of the vehicle in the three-axis direction.

(2) Configuration of In-Vehicle Device

Figure 2:
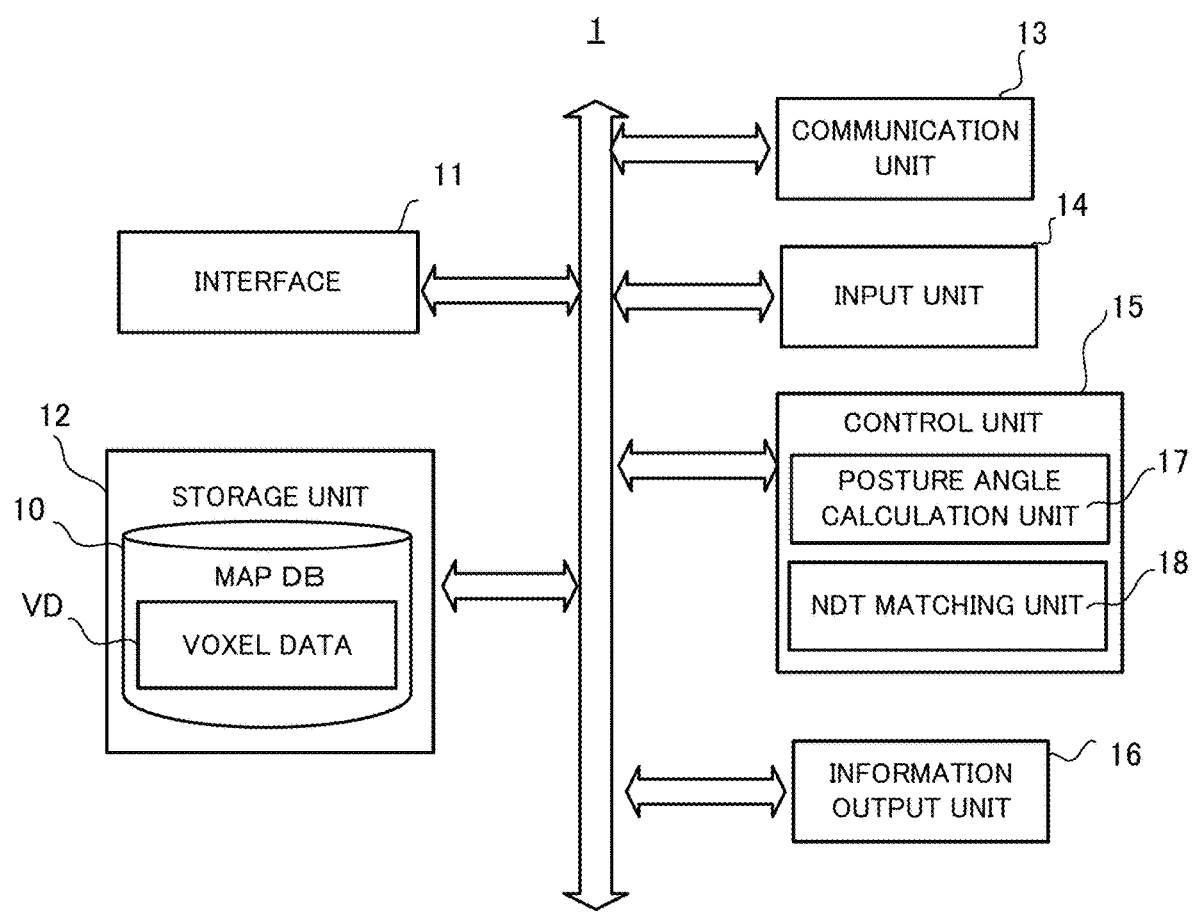
FIG. 2 is a block diagram showing a functional configuration of an in-vehicle device.

FIG. 2 is a block diagram showing a functional configuration of the in-vehicle device 1. The in-vehicle device 1 mainly includes an interface 11, a storage unit 12, a communication unit 13, an input unit 14, a control unit 15, and an information output unit 16. Each of these elements is connected to each other via a bus line.

The interface 11 acquires output data from sensors such as the lidar 2, the gyroscope sensor 3, the vehicle velocity sensor 4, and the GPS receiver 5, and supplies the output data to the control unit 15. Further, the interface 11 supplies a signal relating to the driving control of the vehicle generated by the control unit 15 to the electronic control unit (ECU: Electronic Control Unit) of the vehicle.

The storage unit 12 stores a program to be executed by the control unit 15, and the information necessary for the control unit 15 to execute a predetermined process. In this example, the storage unit 12 stores the map DB 10 including the voxel data VD. The map DB 10 may be updated periodically. In this case, for example, the control unit 15 receives, via the communication unit 13, from the server device which manages the map information, the partial map information relating to the area to which the own vehicle position belongs, and reflects it into the map DB 10. Incidentally, the storage unit 12 may not store the map DB 10. In this case, for example, the control unit 15 communicates, via the communication unit 13, with a server device which stores the map data including the voxel data VD, and thereby acquires information necessary for the own vehicle position estimation processing or the like as necessary.

Examples of the input unit 14 include a button, a touch panel, a remote controller, a voice input device, which are provided for the user to operate. The input unit 14 accepts an input for specifying a destination for the route search, an input for specifying ON or OFF of the autonomous driving operation, and the like. The information output unit 16 is, for example, a display or a speaker or the like for outputting information based on the control of the control unit 15.

The control unit 15 includes a CPU or the like for executing a program, and controls the entire in-vehicle device 1. In this example, the control unit 15 includes a posture angle calculation unit 17 and an NDT matching unit 18. The control unit 15 is an example of the "extraction unit", the "normal vector calculation unit", the "angle calculation unit", the "position estimation unit", the "height calculation unit", and the "computer" that executes a program in the present invention.

The posture angle calculation unit 17 refers to the voxel data VD and calculates at least one of the pitch angle or the roll angle of the vehicle. The NDT matching unit 18 estimate the own vehicle position by performing scan matching based on NDT (NDT scan matching) using point cloud data outputted from the lidar 2 and the voxel data VD corresponding to voxels to which the point cloud data belongs. In this example, as will be described later, in the NDT scan matching, the NDT matching unit 18 sets the planar position of the vehicle (i.e., the position on the horizontal plane specified by latitude and longitude) and the yaw angle (i.e., azimuth orientation) of the vehicle as estimation parameters.

(3) Position Estimation Based on NDT Scan Matching

Figure 3:
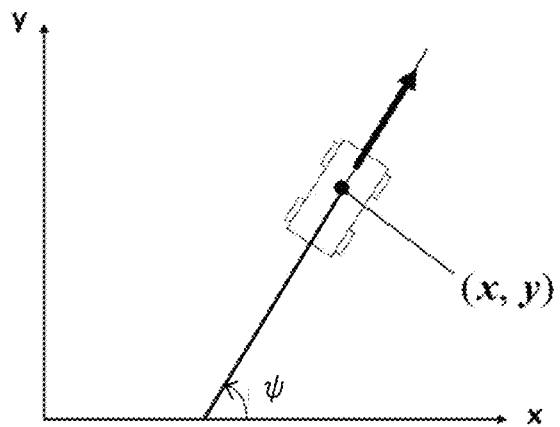
FIG. 3 illustrates a state variable vector in two-dimensional orthogonal coordinates.

FIG. 3 is a diagram showing the own vehicle position to be estimated by the own vehicle position estimator 18 in two-dimensional orthogonal coordinates. As shown in FIG. 3, the own vehicle position on a plane defined in the two-dimensional orthogonal coordinates x-y is represented by the coordinates "(x, y)" and the orientation (yaw angle) "ψ" of the vehicle. Here, the yaw angle ψ is defined as the angle formed by the traveling direction of the vehicle and the x-axis. The coordinates (x, y) indicate, for example, an absolute position corresponding to the combination of latitude and longitude, or world coordinates indicating a position with respect to the predetermined origin. Then, the own vehicle position estimator 18 performs the own vehicle position estimation using these x, y, and w as estimation parameters. The estimation method of the pitch angle and roll angle of the vehicle will be described in detail in the section "(4) Calculation of Posture Angles".

Next, the voxel data VD to be used for NDT scan matching will be described. The voxel data VD includes data representing, by normal distribution, the measured point cloud data of stationary structure(s) in each voxel.

Figure 4:
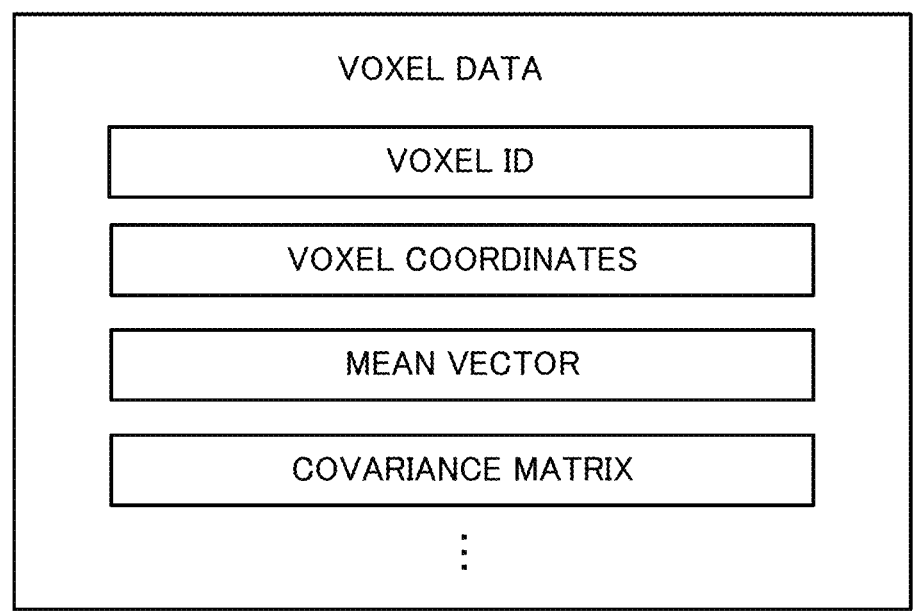
FIG. 4 illustrates an example of a schematic data structure of voxel data.

FIG. 4 shows an example of a schematic data structure of the voxel data VD. The voxel data VD includes information relating to parameters of the normal distribution for representing the point cloud in each voxel. According to the embodiment, as illustrated in FIG. 4, the voxel data VD includes the voxel ID, the voxel coordinates, the mean vector, and the covariance matrix.

The "voxel coordinates" herein indicates three-dimensional absolute coordinates of the reference position (such as central position) of each voxel. It is noted that a voxel is each of cubes (or grids) into which the space is divided in a reticular pattern, and the shape and the size thereof are preliminarily determined. Thus, it is possible to identify the space corresponding to each voxel by its voxel coordinates. It is also noted that the voxel coordinates may be used as the voxel ID.

The "mean vector" and "covariance matrix" indicate the mean vector and the covariance matrix corresponding to parameters of the normal distribution which represents the point cloud in a voxel of interest, respectively. Here, the coordinates of a point "i" in a voxel "n" are defined as follows.

$$X_n(i) = [x_n(i), y_n(i), z_n(i)]^T$$

Besides, if "$N_n$" denotes the number of point clouds in the voxel n, the mean vector "$\mu_n$" and the covariance matrix "$V_n$" in the voxel n are expressed by the following equations (1) and (2), respectively.

$$\mu_n = \begin{bmatrix} \bar{x}_n \\ \bar{y}_n \\ \bar{z}_n \end{bmatrix} = \frac{1}{N_n} \sum_{i=1}^{N_n} X_n(i) \quad (1)$$

$$V_n = \frac{1}{N_n - 1} \sum_{i=1}^{N_n} \{X_n(i) - \mu_n\}\{X_n(i) - \mu_n\}^T \quad (2)$$

Next, an outline of the NDT scan matching using voxel data VD will be described.

In the NDT scan matching assuming a vehicle, the following estimation parameter P, which includes as its elements the movement amount on the road plane (hereinafter referred to as x-y coordinates) and the orientation of the vehicle, is estimated.

$$P = [t_x, t_y, t_\psi]$$

Here, "$t_x$" indicates the moving amount in the x-direction, "$t_y$" indicates the moving amount in the y-direction, "$t_\psi$" indicates the yaw angle.

Here, the point cloud data obtained by the lidar 2 is associated with the voxels to be matched, and the coordinates of a point existing in the corresponding voxel n is expressed as follows.

$$X_L = [x_n(j), y_n(j), z_n(j)]^T$$

Then, the mean value "$L'_n$" of $X_L$ (j) in the voxel n is expressed by the following equation (3).

$$L'_n = \begin{bmatrix} L'_x \\ L'_y \\ L'_z \end{bmatrix} = \frac{1}{N} \sum_{j=1}^{N} X_L(j) \quad (3)$$

When the mean value L' is coordinate-transformed using the above-described estimation parameter P, the coordinate "$L_n$" after the transformation is expressed by the following equation (4).

$$L_n = \begin{bmatrix} L_x \\ L_y \\ L_z \end{bmatrix} = \begin{bmatrix} \cos t_\psi & -\sin t_\psi & 0 \\ \sin t_\psi & \cos t_\psi & 0 \\ 0 & 0 & 1 \end{bmatrix} \begin{bmatrix} L'_x \\ L'_y \\ L'_z \end{bmatrix} + \begin{bmatrix} t_x \\ t_y \\ 0 \end{bmatrix} \quad (4)$$

By using the point cloud data converted into data in the absolute coordinate system (also referred to as "world coordinate system") which is the same coordinate system as the map DB 10, and the mean vector $\mu_n$ and the covariance matrix $V_n$ included in the voxel data VD, the in-vehicle device 1 calculates an evaluation function value (also referred to as "individual evaluation function value") "$E_n$" for the voxel n. In this case, the in-vehicle device 1 calculates the individual evaluation function value $E_n$ for the voxel n based on the following equation (5).

$$E_n = \exp\left\{-\frac{1}{2}(L_n - \mu_n)^T V_n^{-1}(L_n - \mu_n)\right\} \quad (5)$$

Then, the in-vehicle device 1 calculates the total evaluation function value (also referred to as "total evaluation function value E (k)") for all voxels to be matched as shown by the following equation (6).

$$E(k) = \sum_{n=1}^{M} E_n = E_1 + E_2 + \ldots + E_M \quad (6)$$

Thereafter, through an arbitrary root finding algorithm such as Newton method, the in-vehicle device 1 calculates the estimation parameter P at which the total evaluation function value E (k) is maximized. Then, by applying the estimation parameter P to the predicted vehicle position "$X^-$ (k)" tentatively calculated by the dead reckoning, the in-vehicle device 1 calculates the accurately-estimated own vehicle position "$X^\wedge(k)$" using the following equation (7).

$$\hat{x}(k) = \bar{x}(k) + P \quad (7)$$

Here, the state variable vector indicating the own vehicle position at the target reference time of calculation (i.e., the current processing time) "k" is denoted as "$X^-$ (k)" or "$X^\wedge(k)$".

Figure 5:
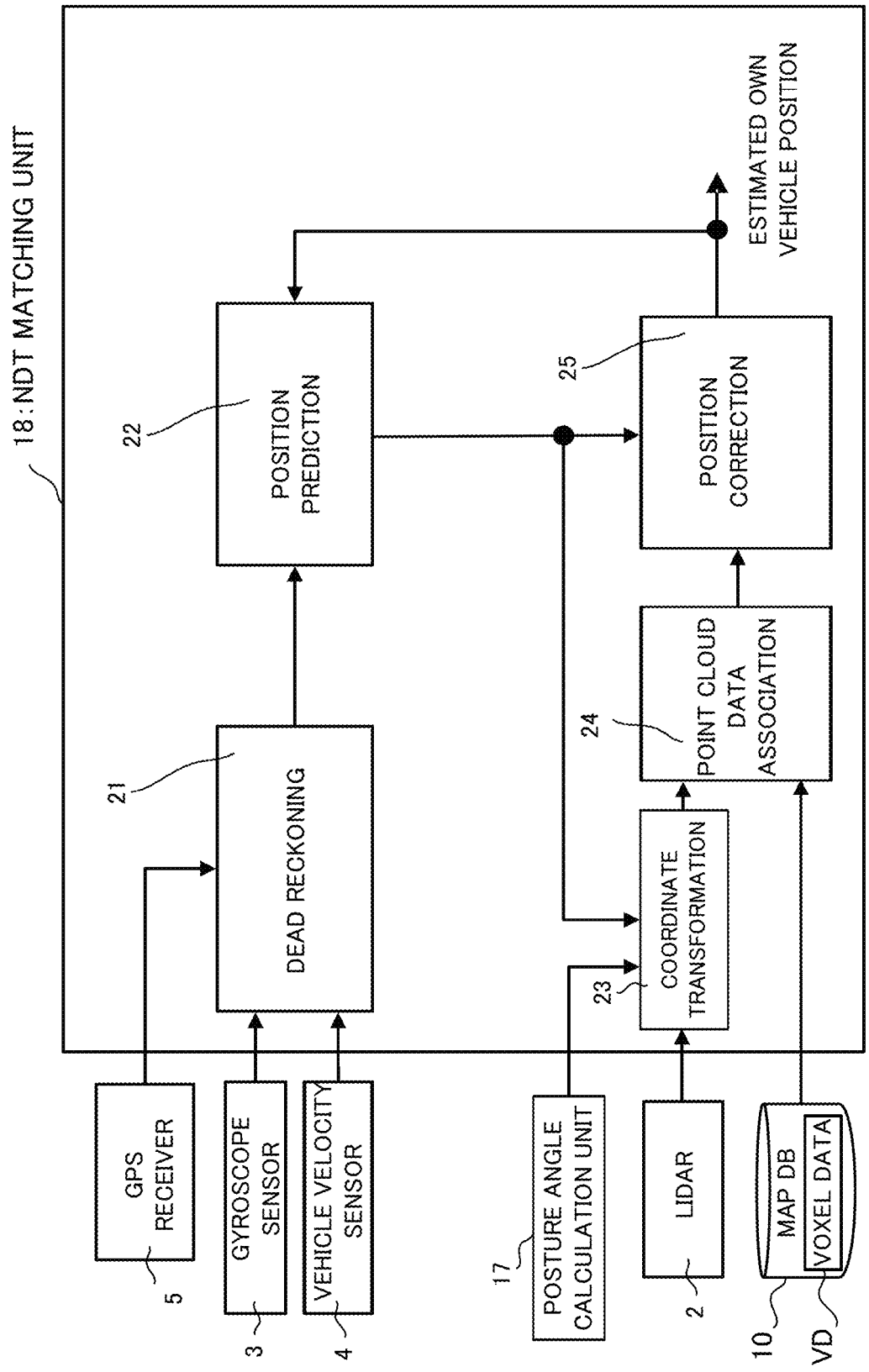
FIG. 5 is an example of a functional block of a NDT matching unit.

FIG. 5 is an example of a functional block of the NDT matching unit 18. As shown in FIG. 5, the own vehicle position estimator 18 includes a dead reckoning block 21, a position prediction block 22, a coordinate transformation block 23, a point cloud data association block 24, and a position correction block 25.

The dead reckoning block 21 uses the movement velocity and angular velocity of the vehicle based on the output of the gyroscope sensor 3, the vehicle velocity sensor 4, and the GPS receiver 5 and the like, to determine the movement distance and orientation change from the preceding processing time. The position prediction block 22 calculates the predicted vehicle position $X^-$ (k) at the time k by adding the calculated movement distance and orientation change to the estimated own vehicle position $X^\wedge(k-1)$ at the time k−1 calculated at the immediately preceding step.

The coordinate transformation block 23 converts the point cloud data outputted from the lidar 2 into data in the world coordinate system that is the same coordinate system as the coordinate system adopted in the map DB 10. In this case, the coordinate transformation block 23 performs the coordinate transformation of the point cloud data outputted by the lidar 2 at time k based on the predicted vehicle position (i.e., the planar position and the azimuth orientation of the vehicle) outputted by the position prediction block 22 at time k and the height and the posture angle (here at least one of the pitch angle or roll angle) of the vehicle outputted by the posture angle calculation unit 17 at time k. Details of this coordinate transformation will be described later.

The point cloud data association block 24 associates the point cloud data with the voxels by performing the matching between the point cloud data in the world coordinate system outputted by the coordinate transformation block 23 and the voxel data VD represented by the same world coordinate system. The position correction block 25 calculates the individual evaluation function value according to the equation (5) for each voxel which is associated with the point cloud data, and calculates the estimation parameter P at which the total evaluation function value E (k) according to the equation (6) becomes the maximum. Then, the position correction block 25 calculates the estimated vehicle position $X^\wedge(k)$ according to the equation (7) by applying the estimation parameter P obtained at time k to the predicted vehicle position $X^-$ (k) outputted by the position prediction block 22.

(4) Calculation of Posture Angles

Next, a description will be given of a calculation method of the pitch angle and the roll angle that are the posture angles of the vehicle by the posture angle calculation unit 17 using the voxel data VD.

(4-1) Calculation of Pitch Angle

First, a description will be given of a calculation method of the pitch angle of the vehicle by the posture angle calculation unit 17.

The posture angle calculation unit 17 refers to the voxel data VD and searches voxels (also referred to as "road surface voxels") corresponding to a road surface for a road surface voxel located at the own vehicle planar position x and y (i.e., $(x^-, y^-)$ or $(x^\wedge, y^\wedge)$) predicted or estimated by the NDT matching unit 18. Then, the posture angle calculation unit 17 acquires the voxel data VD corresponding to the "n" voxels which include the road surface voxel (also referred to as "own vehicle position road surface voxel") located at the own vehicle planar position x, y and its peripheral road surface voxels. Herein, "n" is any integer larger than or equal to 3. The own vehicle position road surface voxel is an example of the "first unit area" in the present invention, and the n−1 peripheral road surface voxels other than the own vehicle position road surface voxel are an example of the "second unit areas" in the present invention.

Figure 6A:
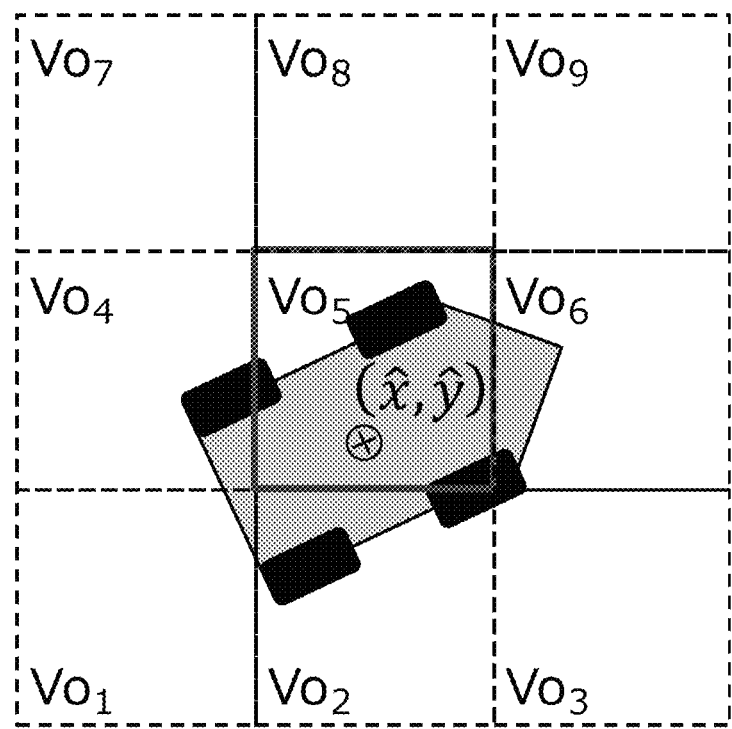
FIG. 6A is a plane view showing the correspondence between the position of the vehicle and road surface voxels.

FIG. 6A is a plane view showing the correspondence between the position of the vehicle and the road surface voxels. FIG. 6A indicates the own vehicle position road surface voxel "Vo5" located at the vehicle planar position x, y (here $(x^\wedge, y^\wedge)$), and other road surface voxels "Vo1" to "Vo4" and "Vo6" to "Vo9" positioned at front, rear, left and right of the own vehicle position road surface voxel Vo5. In this example, "n=9" is assumed, and the posture angle calculation unit 17 acquires the voxel data VD corresponding to the nine road surface voxels Vo1 to Vo9 from the map DB 10.

Next, the posture angle calculation unit 17 calculates mean vectors (also referred to as a "road surface mean vectors") in the world coordinate system of the road surface included in the n road surface voxels, based on the information indicative of the voxel coordinates and the mean vectors included in the voxel data VD corresponding to the n road surface voxels, respectively.

Figure 6B:
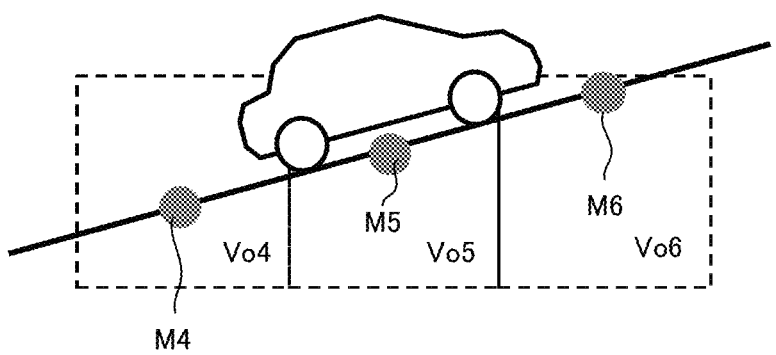
FIG. 6B is a side view of the vehicle which explicitly indicates the road surface mean vector.

FIG. 6B is a side view of the vehicle that explicitly indicates a road surface mean vector for each road surface voxel. FIG. 6B indicates the coordinate positions "M4" to "M6" of the road surface mean vectors corresponding to the road surface voxels Vo4 to Vo6 shown in FIG. 6A, respectively. Since "n=9", the posture angle calculation unit 17 calculates the road surface mean vectors corresponding to the nine road surface voxels Vo1 to Vo9, based on the voxel data VD corresponding to the nine road surface voxels Vo1 to Vo9, respectively.

Next, the posture angle calculation unit 17 considers the road surface as a plane, and expresses the equation of the plane approximating the road surface by the following equation (8).

$$z = ax + by + c \quad (8)$$

Then, the posture angle calculation unit 17 substitutes the calculated n road surface mean vectors, $(x_1, y_1, z_1), (x_2, y_2, z_2), \ldots, (x_n, y_n, z_n)$, into the equation (8) and thereby acquires a simultaneous equation with n equations shown in the following equation (9).

$$\begin{cases} z_1 = ax_1 + by_1 + c \\ z_2 = ax_2 + by_2 + c \\ \cdots \\ z_n = ax_n + by_n + c \end{cases} \quad (9)$$

Here, expressing the equations (9) by a matrix, the following equation (10) is obtained.

[Number 10]

$$\begin{bmatrix} x_1 & y_1 & 1 \\ x_2 & x_2 & 1 \\ \vdots & & \\ x_n & y_n & 1 \end{bmatrix} \begin{bmatrix} a \\ b \\ c \end{bmatrix} = \begin{bmatrix} z_1 \\ z_2 \\ \vdots \\ z_n \end{bmatrix} \quad (10)$$

Here, when "C" denotes the n×3 matrix on the left side, "a" denotes 3×1 matrix (i.e., vector) on the left side, and "b" denotes n×1 matrix (i.e., vector) on the right side, the equation (10) is converted into the following equation (11).

$$Ca = b \quad (11)$$

Then, by modifying the equation (11), the following equation (12) is obtained as a normal equation.

$$C^T Ca = C^T b \quad (12)$$

Therefore, when n is 3 or more, the posture angle calculation unit 17 can calculate, by the least squares method according to the following equation (13), the coefficient vector "a=[a, b, c]$^T$" of the plane equation shown in the equation (8).

$$a = (C^T C)^{-1} C^T b \quad (13)$$

Further, when deforming the plane equation of the equation (8), the following equation (14) is obtained.

$$-ax - by + z - c = 0 \quad (14)$$

Based on the equation (14), the normal vector "Vn" of the plane is expressed by the following equation (15).

$$v_n = \begin{bmatrix} -a \\ -b \\ 1 \end{bmatrix} \quad (15)$$

Figure 7:
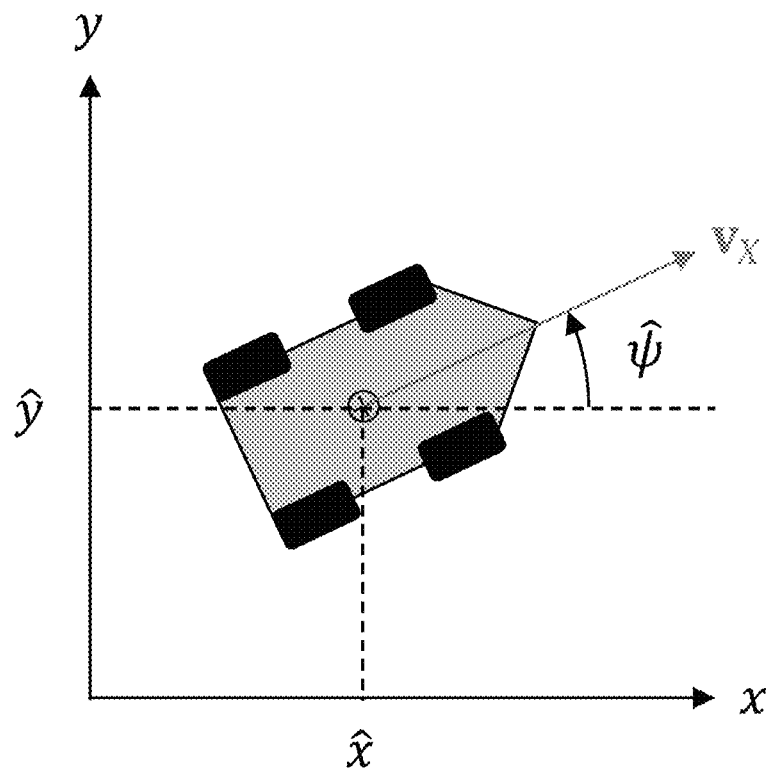
FIG. 7 is an x-y plane view showing the relation between the yaw angle and the traveling direction vector of the vehicle.

The posture angle calculation unit 17 determines the orientation vector "$V_X$" of the vehicle on the x-y plane based on the yaw angle predicted or estimated by the NDT matching unit 18. FIG. 7 is a x-y plane view showing the relation between the yaw angle of the vehicle (here $\psi^\wedge$) and the traveling direction vector $V_X$. The z component of the traveling direction vector $V_X$ is 0, and the x component and y component are proportional to the cosine and sine of the yaw angle of the vehicle, respectively. Thus, the traveling direction vector $V_X$ is given by the following equation (16).

$$v_X = \begin{bmatrix} \cos\hat{\psi} \\ \sin\hat{\psi} \\ 0 \end{bmatrix} \quad (16)$$

In this case, the angle "θ'" formed by the normal vector Vn and the traveling direction vector $V_X$ is indicated by the following equation (17) which includes the inner product calculation of the normal vector Vn and the traveling direction vector $V_X$.

$$\cos\theta' = \frac{v_n \cdot v_X}{|v_n||v_X|} = \frac{-a\cos\hat{\psi} - b\sin\hat{\psi}}{\sqrt{a^2+b^2+1}\sqrt{\cos^2\hat{\psi}+\sin^2\hat{\psi}}} = \frac{-a\cos\hat{\psi} - b\sin\hat{\psi}}{\sqrt{a^2+b^2+1}} \quad (17)$$

Then, the posture angle calculation unit 17, based on the angle θ' formed by the normal vector Vn and the traveling direction vector $V_X$, calculates the pitch angle "θ" of the vehicle.

Figure 8:
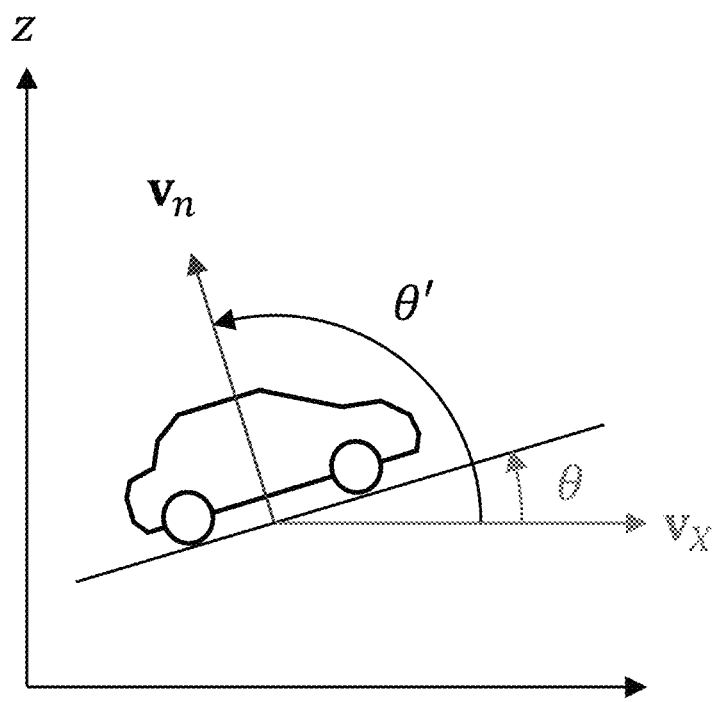
FIG. 8 illustrates the relation among the angle formed by the normal vector, the traveling direction vector, and the pitch angle of the vehicle.

FIG. 8 shows the relation between the pitch angle θ of the vehicle and the angle θ' formed by the normal vector Vn and the traveling direction vector $V_X$. As shown in FIG. 8, the angle θ' formed by the normal vector Vn and the traveling direction vector $V_X$ is larger by 90 degrees (i.e., π/2) than the pitch angle θ of the vehicle. Further, since the vehicle is constrained on the road surface, the inclination of the road surface in the traveling direction of the vehicle is equal to the pitch angle θ of the vehicle. Therefore, the posture angle calculation unit 17 calculates the pitch angle θ based on the following equation (18).

$$\theta = \theta' - \frac{\pi}{2} = \cos^{-1}\frac{-a\cos\hat{\psi} - b\sin\hat{\psi}}{\sqrt{a^2+b^2+1}} - \frac{\pi}{2} \quad (18)$$

In this way, the posture angle calculation unit 17 can suitably calculate the pitch angle of the vehicle based on: the coefficient vector of the plane equation calculated from the n road surface mean vectors based on the voxel data VD of the road surface voxels; and the yaw angle predicted or estimated by the NDT matching unit 18.

(4-2) Estimation of Roll Angle

As with the calculation of the pitch angle, the posture angle calculation unit 17 calculates the normal vector Vn shown in the equation (15) by using the n road surface mean vectors based on the voxel data VD.

Figure 9:
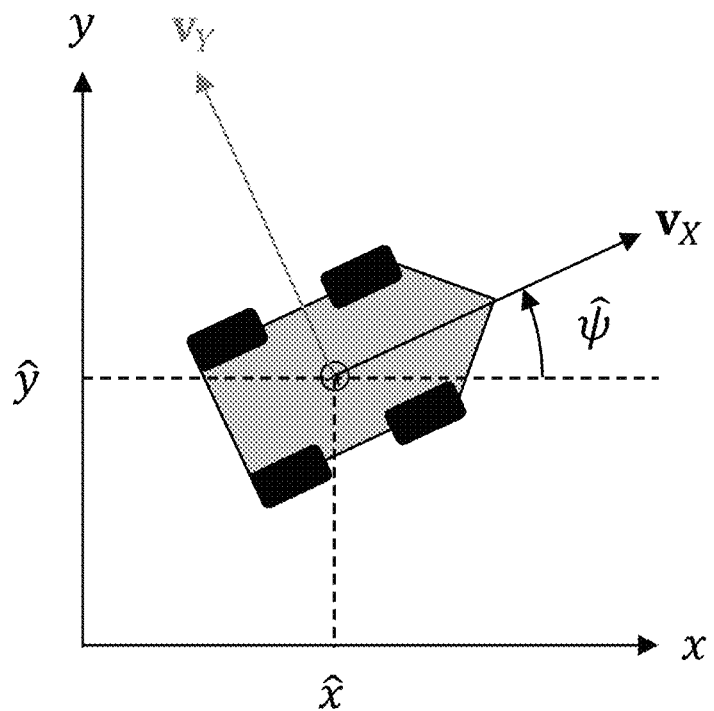
FIG. 9 is an x-y plane view showing the relation between the yaw angle and the lateral direction vector of the vehicle.

Further, the posture angle calculation unit 17 determines the lateral direction vector "$V_Y$" of the vehicle on the x-y plane based on the yaw angle predicted or estimated by the NDT matching unit 18. FIG. 9 is an x-y plane view showing the relation between the yaw angle of the vehicle (here $\hat{\psi}$) and the lateral direction vector $V_Y$. As shown in FIG. 9, the lateral direction vector $V_Y$ corresponds to a direction in which the yaw angle (here, referred to as $\hat{\psi}$) predicted or estimated by the NDT matching unit 18 is rotated by 90 degrees (π/2) along the x-y plane. Therefore, the lateral direction vector $V_Y$ is given by the following equation (19).

$$v_Y = \begin{bmatrix} \cos\frac{\pi}{2} & -\sin\frac{\pi}{2} & 0 \\ \sin\frac{\pi}{2} & \cos\frac{\pi}{2} & 0 \\ 0 & 0 & 1 \end{bmatrix} v_X = \begin{bmatrix} 0 & -1 & 0 \\ 1 & 0 & 0 \\ 0 & 0 & 1 \end{bmatrix}\begin{bmatrix} \cos\hat{\psi} \\ \sin\hat{\psi} \\ 0 \end{bmatrix} = \begin{bmatrix} -\sin\hat{\psi} \\ \cos\hat{\psi} \\ 0 \end{bmatrix} \quad (19)$$

In this case, the angle "φ'" formed by the normal vector Vn and the lateral direction vector $V_Y$ is expressed by the following equation (20), which includes the inner product calculation of the normal vector Vn and the lateral direction vector $V_Y$.

$$\cos\phi' = \frac{v_n \cdot v_Y}{|v_n||v_Y|} = \frac{-a\cos\hat{\psi} - b\sin\hat{\psi}}{\sqrt{a^2+b^2+1}\sqrt{\cos^2\hat{\psi}+\sin^2\hat{\psi}}} = \frac{-a\cos\hat{\psi} - b\sin\hat{\psi}}{\sqrt{a^2+b^2+1}} \quad (20)$$

Then, the posture angle calculation unit 17 calculates, based on the angle φ' formed by the normal vector Vn and the lateral direction vector $V_Y$, the roll angle "φ" of the vehicle.

Figure 10:
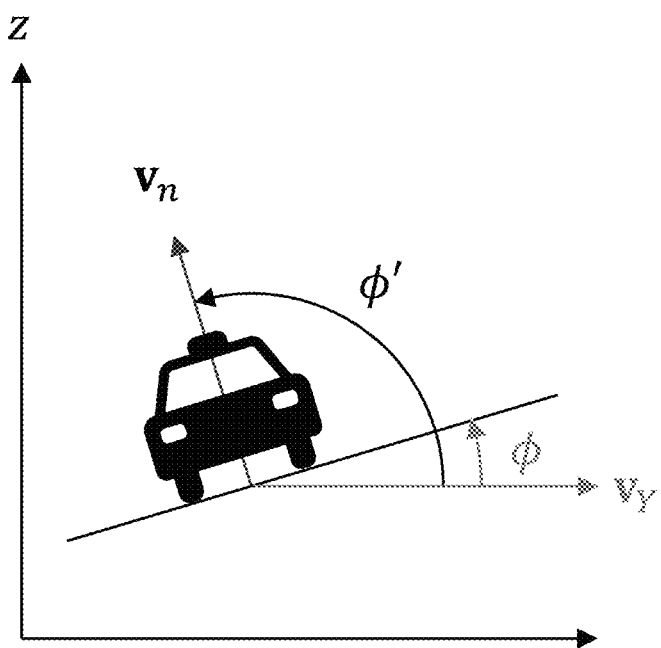
FIG. 10 illustrates the relation among the angle formed by the normal vector, the lateral direction vector, and the roll angle of the vehicle.

FIG. 10 illustrates the relation between the roll angle φ of the vehicle and the angle φ' formed by the normal vector Vn and the lateral direction vector $V_Y$. As shown in FIG. 10, the angle φ' formed by the normal vector Vn and the lateral direction vector $V_Y$ is larger by 90 degrees (i.e., π/2) than the roll angle φ of the vehicle. Further, since the vehicle is constrained on the road surface, the inclination of the road surface in the lateral direction of the vehicle is equal to the roll angle φ of the vehicle. Therefore, the posture angle calculation unit 17 calculates the roll angle φ based on the following equation (21).

$$\phi = \phi' - \frac{\pi}{2} = \cos^{-1}\frac{a\cos\hat{\psi} - b\sin\hat{\psi}}{\sqrt{a^2+b^2+1}} - \frac{\pi}{2} \quad (21)$$

In this way, the posture angle calculation unit 17 can suitably calculate the roll angle of the vehicle based on: the coefficient vector of the plane equation calculated from n road surface mean vectors based on the voxel data VD; and the yaw angle predicted or estimated by the NDT matching unit 18.

(5) Coordinate Transformation of Point Cloud Data

Next, a description will be given of the coordinate transformation of the point cloud data based on the pitch angle calculated by the posture angle calculation unit 17.

The coordinate transformation block 23 of the NDT matching unit 18 generates, using the pitch angle θ calculated by the posture angle calculation unit 17, a rotation matrix "Re" shown in the following equation (22).

$$R_\theta = \begin{bmatrix} \cos\theta & 0 & -\sin\theta \\ 0 & 1 & 0 \\ \sin\theta & 0 & \cos\theta \end{bmatrix} \quad (22)$$

Here, when n pieces of three-dimensional data is detected by the lidar 2, a matrix "$X_L$" representing these n pieces of three-dimensional data is represented by the following equation (23).

$$X_L = \begin{bmatrix} x_1 & y_1 & z_1 \\ x_2 & x_2 & z_2 \\ \vdots & \vdots & \vdots \\ x_n & y_n & z_n \end{bmatrix} \quad (23)$$

In this case, the coordinate transformation block 23 performs the coordinate transformation of the point cloud data with respect to the pitch angle θ according to the following equation (24).

$$X'_L = (R_\theta X_L^T) \quad (24)$$

Then, the coordinate transformation block 23 adds the predicted or estimated three-dimensional own vehicle position (x, y, z) to the n pieces of the three-dimensional data corresponding to each row of $X_L'$ in the equation (24). Thereby, the point cloud data in which the three-dimensional position x, y, z is also converted to the world coordinate system is generated. Then, the coordinate conversion block 23 supplies the point cloud data converted into the world coordinate system, to the point cloud data association block 24.

Next, a description will be given of the coordinate transformation in consideration of both the pitch angle θ and the roll angle φ. Using the rotation matrix $R_θ$ based on the pitch angle θ calculated by the posture angle calculation unit 17 and the rotation matrix "$R_φ$" based on the roll angle φ, the coordinate transformation block 23 generates the rotation matrix "R" to be multiplied by the matrix $X_L$ indicating n pieces of the three-dimensional data outputted by the lidar 2, according to the following equation (25).

$$R = R_φ R_θ = \begin{bmatrix} 1 & 0 & 0 \\ 0 & \cos φ & \sin φ \\ 0 & -\sin φ & \cos φ \end{bmatrix} \begin{bmatrix} \cos θ & 0 & -\sin θ \\ 0 & 1 & 0 \\ \sin θ & 0 & \cos θ \end{bmatrix} \quad (25)$$

In this case, the position prediction block 22 performs the coordinate transformation of the point cloud data to the world coordinate system with respect to the pitch angle θ and the roll angle φ, according to the following equation (26).

$$X'_L = (RX_L^T)^T \quad (26)$$

Thereafter, the coordinate transformation block 23 performs the coordinate transformation of the point cloud data to the world coordinate system with respect to the yaw angle ψ, by multiplying $X_L'$ in the equation (26) by the rotation matrix based on the yaw angle ψ in the same way. Further, the coordinate transformation block 23 performs the coordinate transformation to the world coordinate system with respect to the three-dimensional position by adding the predicted or estimated vehicle position (x, y, z) to the n pieces of the three-dimensional data corresponding to each row of $X_L'$ after the coordinate transformation. Then, the coordinate conversion block 23 supplies the point cloud data association block 24 with the point cloud data converted into the world coordinate system through the above-described process.

In some embodiments, the coordinate transformation block 23 converts the point cloud data indicating three-dimensional positions with reference to the lidar 2 to data in the vehicle coordinate system, wherein each of the three-dimensional positions is expressed by a combination of the distance measured by the lidar 2 and the scan angle. The vehicle coordinate system is the coordinate system of the vehicle whose axes are along the traveling direction and the lateral direction of the vehicle. In this case, based on the information of the installation position and installation angle of the lidar 2 to the vehicle, the coordinate transformation block 23 converts the point cloud data in the coordinate system with respect to the lidar 2 to data in the vehicle coordinate system and further converts the converted point cloud data in the vehicle coordinate system to data in the world coordinate system according to the above-mentioned approach. Examples of the process of converting the point cloud data outputted by a lidar installed in the vehicle to data in the vehicle coordinate system is disclosed in WO2019/188745.

Further, the coordinate transformation block 23 may perform the coordinate transformation considering only the roll angle φ instead of considering both the pitch angle θ and the roll angle cp. In this case, the coordinate transformation block 23 may multiply the rotation matrix $R_φ$ shown in the equation (25) by the matrix $X_L$ representing n pieces of the three-dimensional data outputted by the lidar 2.

Next, the effect of the above-described coordinate transformation will be supplementally described with reference to FIGS. 11A, 11B and 12.

Figure 11A:
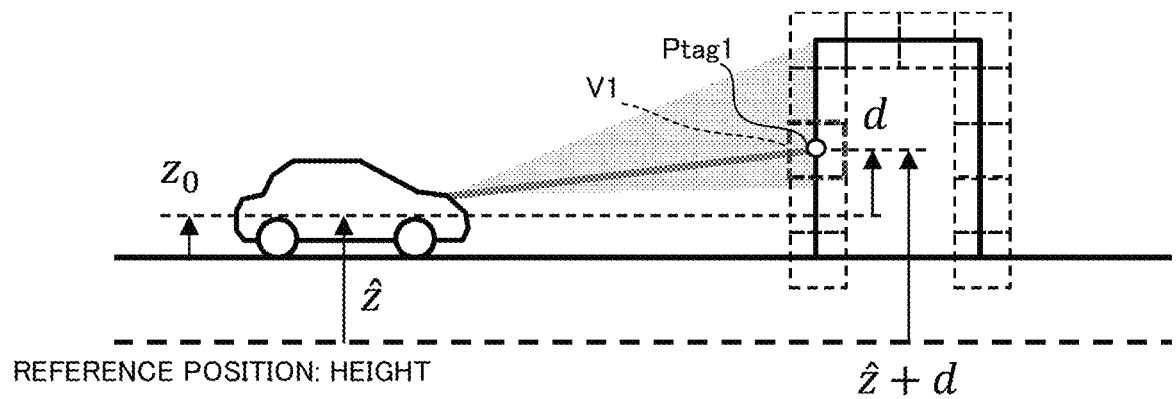
FIG. 11A is a side view of a road and the vehicle traveling on the flat road surface.

FIG. 11A is a side view of a road and the vehicle running on a flat road surface. In this case, the vehicle height "z" from the reference position (e.g., the position where the altitude is 0) of the world coordinate system is the height obtained by adding the height (also referred to as "vehicle reference position $z_0$") of the vehicle from the road surface to the height of the road surface from the reference position of the world coordinate system. Then, the height "$z^\wedge$+d" obtained by adding the height "d" of a certain measurement point "Ptag1" measured by the lidar 2 from the vehicle to the vehicle height $z^\wedge$ matches the actual height of the measurement point Ptag1 in the world coordinate system. Therefore, in this case, in the associating process executed by the point cloud data association block 24, the measurement point Ptag1 is associated with the voxel "V1" where the measurement point Ptag1 is actually included.

Figure 11B:
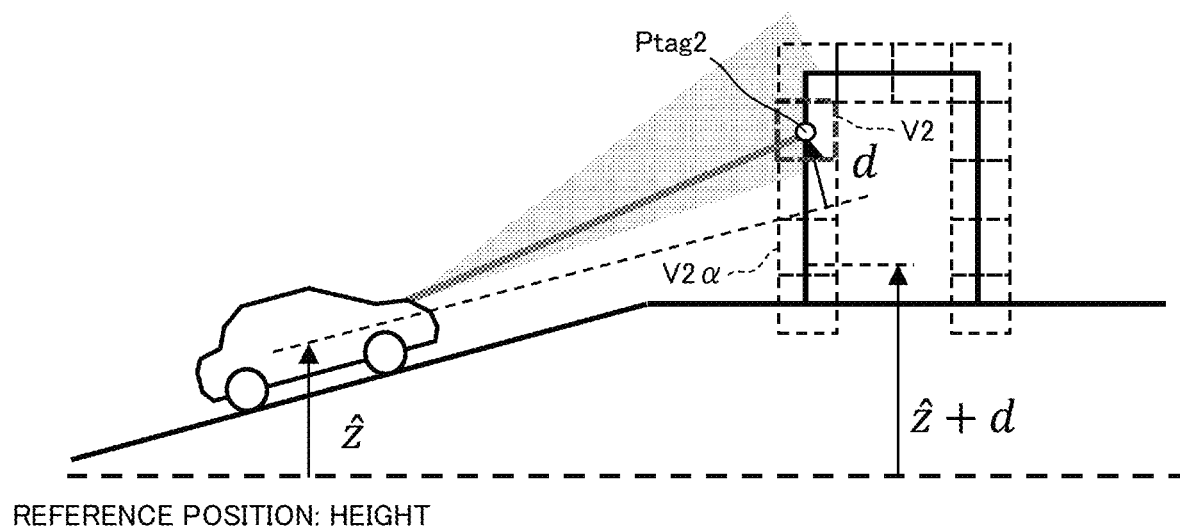
FIG. 11B is a side view of a road and the vehicle traveling on a road surface having a large gradient in the case of not performing the coordinate transformation of the point cloud data based on the pitch angle of the vehicle.

FIG. 11B is a side view of a road and the vehicle traveling on a large gradient road surface in the case of not performing the coordinate transformation of the point cloud data based on the pitch angle of the vehicle. In this case, since the pitch angle is generated in the vehicle by the road surface gradient, the point cloud data becomes upward. Therefore, the height, in the world coordinate system, of the measurement point "Ptag2" present at the position of the height d from the vehicle is not equal to "$z^\wedge$+d" obtained by adding the height d to the vehicle height $z^\wedge$. Consequently, in the associating process executed by the point cloud data association block 24, the measurement point Ptag2 is not associated with the voxel "V2" in which the measurement point Ptag2 is actually present but mistakenly associated with the voxel "V2α" because its height in the world coordinate system is calculated as "$z^\wedge$+d".

Figure 12:
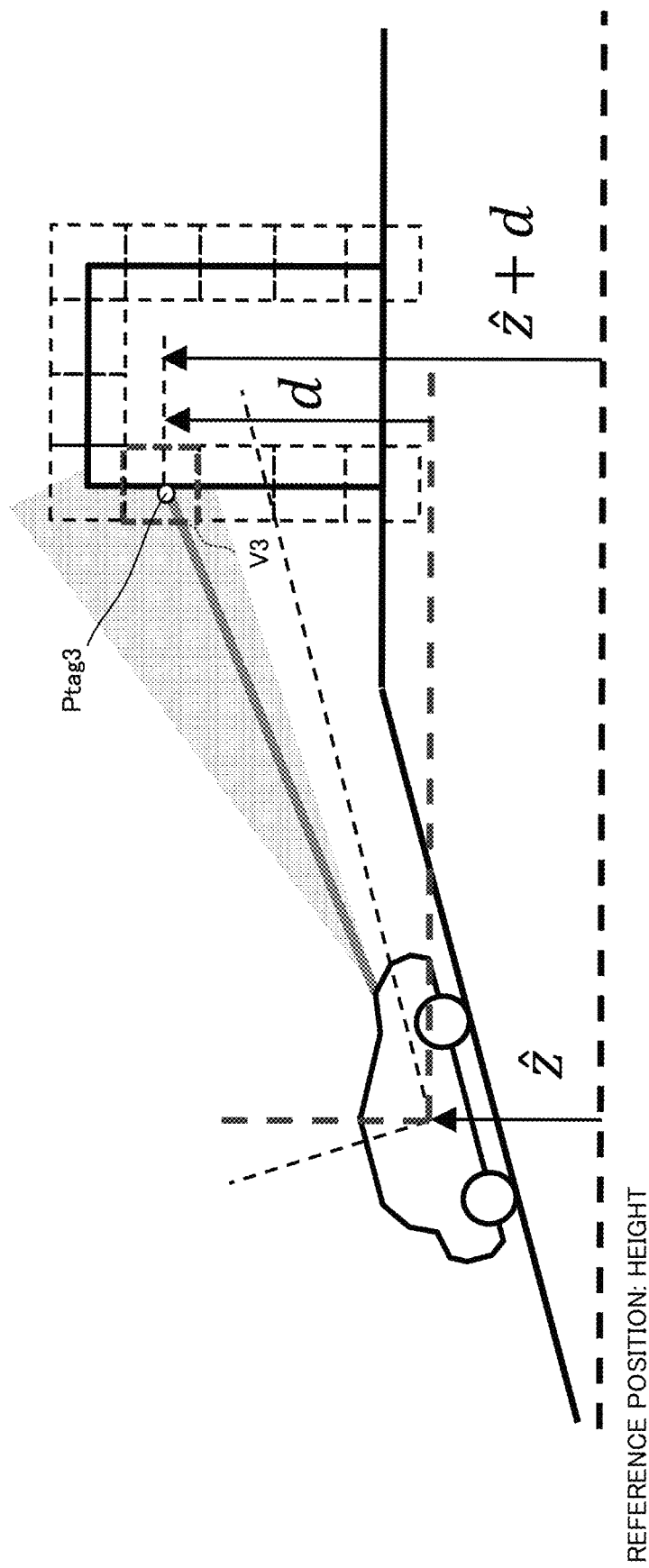
FIG. 12 is a side view of a road and the vehicle traveling on a road surface having a large gradient in the case of performing the coordinate transformation of the point cloud data based on the pitch angle of the vehicle.

FIG. 12 is a side view of the road and the vehicle traveling on a large slope road surface in the case of performing the coordinate transformation of the point cloud data based on the pitch angle of the vehicle based on the present embodiment. In this case, through the rotation matrix based on the pitch angle determined by the calculation method according to the embodiment, the point cloud data outputted by the lidar 2 is converted to data in the world coordinate system in consideration of the pitch angle of the vehicle. Therefore, in this case, the height, in the world coordinate system, of the measurement point "Ptag3" present at the position of the height d from the vehicle is equal to "$z^\wedge$+d". Therefore, in the associating process executed by the point cloud data association block 24, the measurement point Ptag3 is associated with the voxel V3 (i.e., correct matching target) where the measurement point Ptag3 is actually present and therefore the NDT scan matching is preferably performed.

Even when traveling on a road where a cross slope such as a cant is present, the in-vehicle device 1 performs the coordinate transformation of the point cloud data based on the roll angle of the vehicle thereby to suitably associate each measurement point of the point cloud data outputted by the lidar 2 with the voxel that is a correct matching target.

(6) Processing Flow

Next, a specific processing flow of the estimation process of the vehicle position and posture by NDT matching including the estimation of the pitch angle and the roll angle described above will be described with reference to flowcharts.

(6-1) Outline of Vehicle Position and Posture Estimation Process

Figure 13:
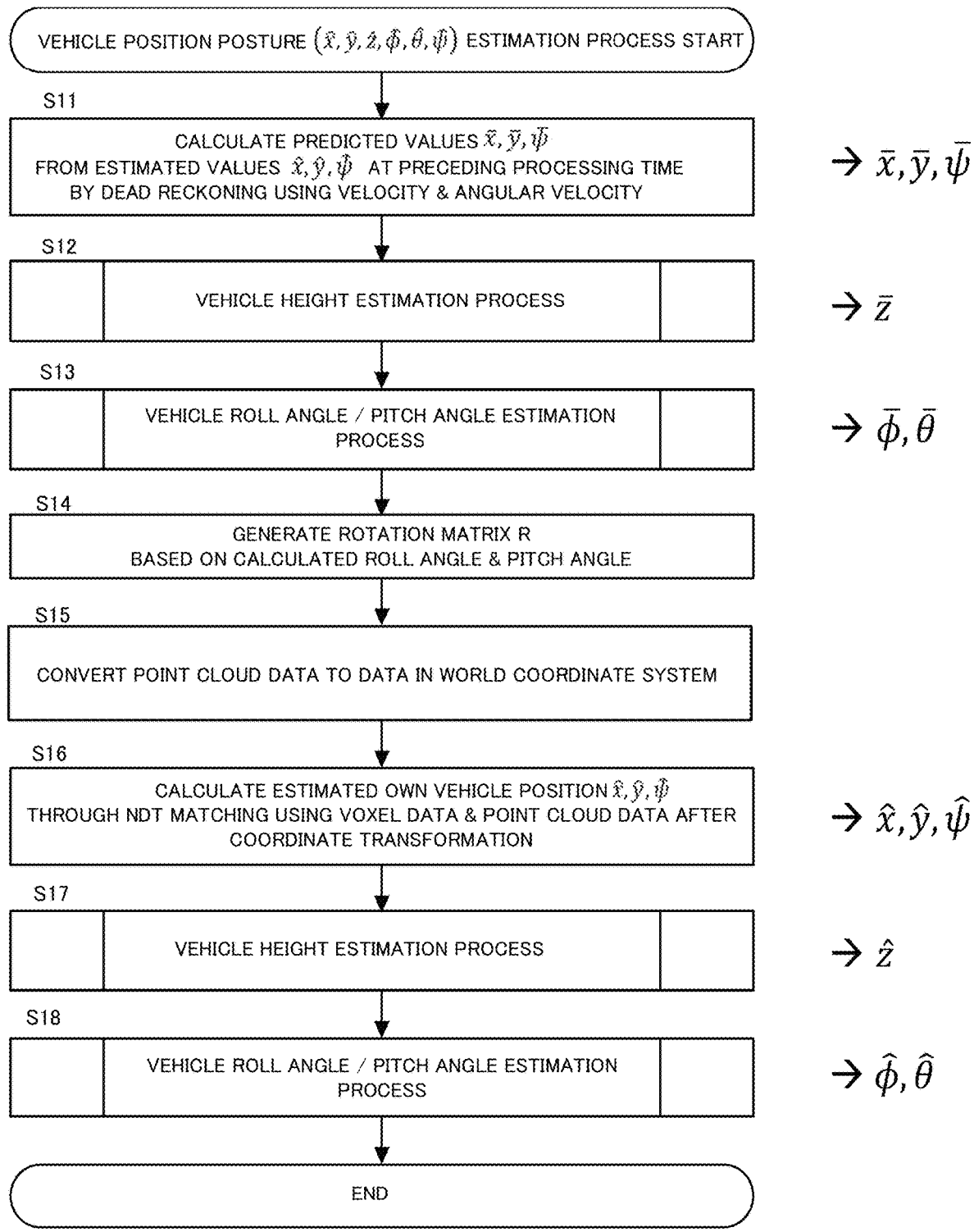
FIG. 13 is an example of a flowchart showing the procedure of the estimation process of the position and posture of the vehicle.

FIG. 13 is an example of a flowchart showing the procedure of estimation processing of the vehicle position and posture. The posture angle calculation unit 17 and the NDT matching unit 18 of the in-vehicle device 1 repeatedly execute the processing of the flowchart shown in FIG. 13 at predetermined time intervals at which the estimation of the position and the posture of the vehicle should be performed. Symbols displayed on the right of each step in FIG. 13 represent the elements calculated in each step.

First, the dead reckoning block 21 of the NDT matching unit 18 determines the movement distance and the azimuth orientation change from the previous time using the movement velocity and the angular velocity calculated based on the output by the gyro sensor 3, the vehicle velocity sensor 4, and the GPS receiver 5. Thereby, the position prediction block 22 of the NDT matching unit 18 calculates the predicted vehicle position $x^-$, $y^-$, $\psi^-$ at the current processing time from the estimated vehicle position $\hat{x}$, $\hat{y}$, $\hat{\psi}$ obtained at the preceding processing time (i.e., one processing time before the current processing time) (step S11).

Next, the posture angle calculation unit 17 calculates the predicted vehicle height "$z^-$" by performing the estimation process of the vehicle height (e.g., the altitude where the vehicle is located) (step S12). This process will be described later with reference to FIG. 14. Furthermore, the posture angle calculation unit 17 calculates the predicted roll angle "$\varphi^-$" and predicted pitch angle "$\theta^-$" by performing the vehicle roll angle/pitch angle estimation process (step S13). This process will be described later with reference to FIG. 15.

Then, the coordinate conversion block 23 of the NDT matching unit 18 generates the rotation matrix R (see the equation (25)) based on the roll angle and pitch angle calculated at step S13 (step S14). Then, the coordinate conversion block 23 converts the point cloud data into data in the world coordinate system (step S15). Thereafter, the NDT matching unit 18 (i.e., the point cloud data association block 24 and the position correction block 25) performs NDT matching using the point cloud data and the voxel data VD after the coordinate transformation to thereby calculate the estimated vehicle position $\hat{x}$, $\hat{y}$, $\hat{\psi}$ at the current processing time (step S16). Thereafter, the posture angle calculation unit 17 calculates the estimated vehicle height "$z$" by performing the same height estimation process of the vehicle as the process at step S12 again using the calculated estimated vehicle position $\hat{x}$, $\hat{y}$, $\hat{\psi}$ at the current processing time (step S17). This process will be described later with reference to FIG. 14. Furthermore, using the calculated estimated vehicle position $\hat{x}$, $\hat{y}$, $\hat{\psi}$ and the estimated vehicle height $\hat{z}$ at the current processing time, the posture angle calculation unit 17 calculates the estimated roll angle "$\hat{\varphi}$" and the estimated pitch angle "$\hat{\theta}$" through the vehicle roll angle/pitch angle estimation process (step S18). This process will be described later with reference to FIG. 15.

(6-2) Vehicle Height Estimation Processing

Figure 14:
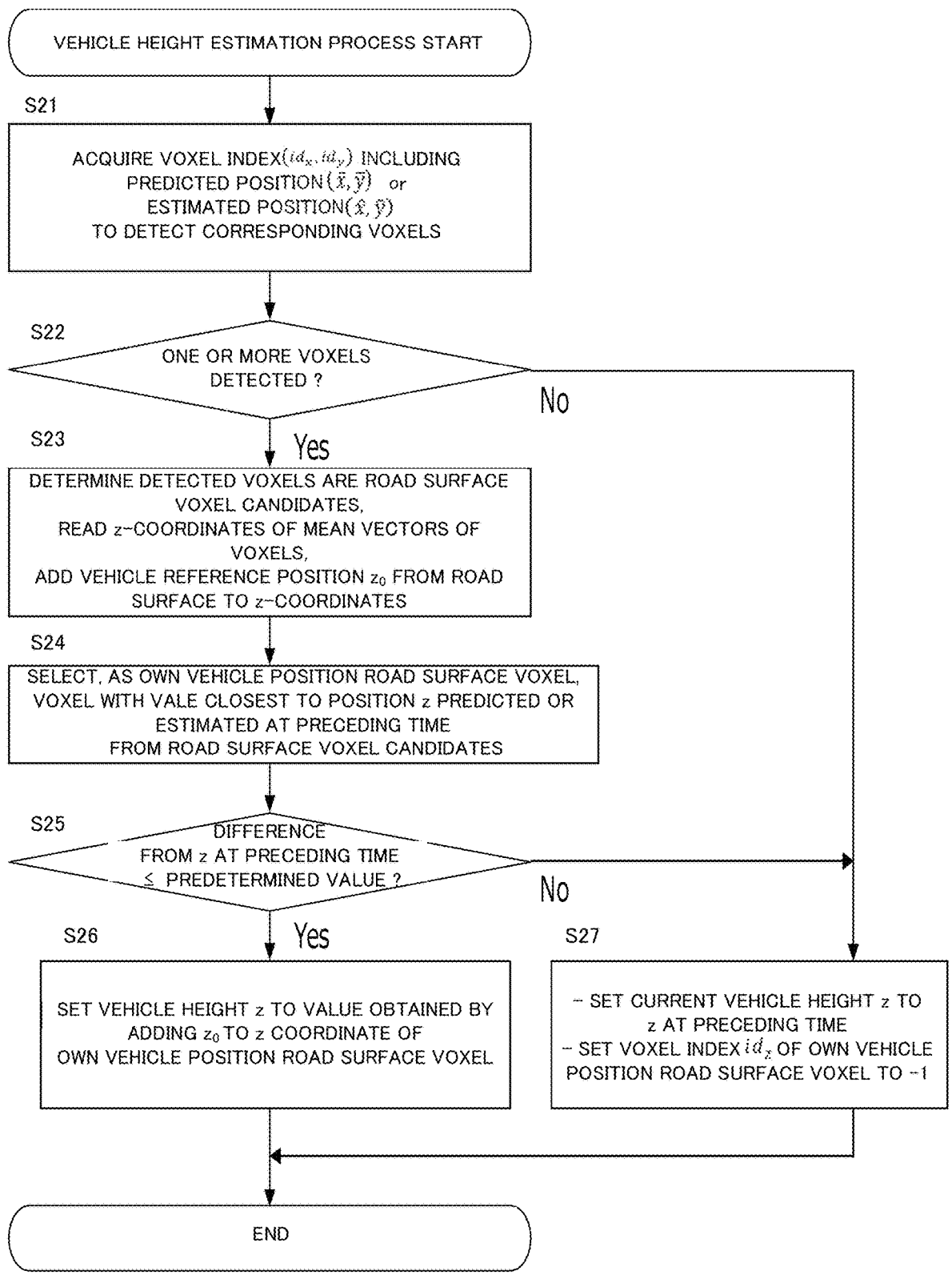
FIG. 14 is an example of a flowchart showing the procedure of the vehicle height estimation process.

FIG. 14 is an example of a flowchart showing the procedure of the vehicle height estimation process to be executed at step S12 and step S17 in FIG. 13. In the vehicle height estimation process, the posture angle calculation unit 17 determines the own vehicle position road surface voxel based on the predicted or estimated planar position of the vehicle, and determines the vehicle height to be a value obtained by adding the vehicle reference position $z_0$ (the height of the vehicle from the road surface) to the z-coordinate of the mean vector of the own vehicle position road surface voxel. Further, the in-vehicle device 1 carries out labeling by setting the voxel index idz of the own vehicle position road surface voxel with low reliability to "−1" so as not to use the own vehicle position road surface voxel with low reliability in the estimation process of the roll angle and pitch angle to be described later.

First, the posture angle calculation unit 17 acquires the voxel index (idx, idy) of the voxel where the predicted vehicle position $x^-$, $y^-$ or the estimated vehicle position $\hat{x}$, $\hat{y}$ belongs, and searches for voxels having the voxel index (idx, idy) (step S21). Namely, the posture angle calculation unit 17 refers to the voxel data VD and searches the height direction of the voxels having the same planar position in the x-y plane with the predicted vehicle position $x^-$, $y^-$ or the estimated vehicle position $\hat{x}$, $\hat{y}$. In case of processing at step S12 in FIG. 13, the posture angle calculation unit 17 searches for voxels having the voxel index (idx, idy) of the voxel including the predicted vehicle position $x^-$, $y^-$. In case of processing at step S17 in FIG. 13, the posture angle calculation unit 17 searches for voxels having the voxel index (idx, idy) of the voxel including the estimated vehicle position $\hat{x}$, $\hat{y}$.

Next, the posture angle calculation unit 17 determines whether or not one or more voxels have been detected at step S21 (step S22). If one or more voxels is not detected at step S21 (step S22: No), the posture angle calculation unit 17 determines the predicted vehicle height $z^-$ or the estimated vehicle height $\hat{z}$ at the preceding processing time as the predicted vehicle height $z^-$ or the estimated vehicle height $\hat{z}$ to be obtained (step S27). Further, at step S27, the posture angle calculation unit 17 determines a temporary own vehicle position road surface voxel in which the voxel index idz 15 "−1".

On the other hand, if one or more voxels are detected at step S21 (step S22; Yes), the posture angle calculation unit 17 determines that the detected voxels are candidates of the own vehicle position road surface voxel. Then, the posture angle calculation unit 17 reads each z-coordinates of the candidates (i.e., z-coordinates of the mean vectors of the candidates) from the voxel data VD and adds the vehicle reference position $z_0$ to the each z-coordinate (step S23). The vehicle reference position $z_0$ is previously stored, for example, in the storage unit 12.

The posture angle calculation unit 17 selects, as the own vehicle position road surface voxel, a candidate of the own vehicle position road surface voxel whose value obtained by adding the vehicle reference position $z_0$ to the z coordinate of the mean vector of the candidate becomes the value closest to the predicted vehicle height $z^-$ or the estimated vehicle height $\hat{z}$ at the preceding processing time (step S24).

If the difference between the value obtained by adding the vehicle reference position $z_0$ to the z-coordinate of the mean vector of the selected vehicle position road surface voxel and the predicted vehicle height $z^-$ or the estimated vehicle height $\hat{z}$ at the preceding processing time is equal to or less than a predetermined value (step S25; Yes), the posture angle calculation unit 17 executes the process at step S26. In this case, for example, the above-mentioned predetermined value is set to the upper limit of the fluctuation width of the height that can occur in the vehicle on a hill during the time interval from the preceding processing time to the current processing time.

Then, the posture angle calculation unit 17 determines that the value obtained by adding the vehicle reference position $z_0$ to the z-coordinate of the mean vector of the own vehicle position road surface voxel is the predicted vehicle height $z^-$ or the estimated vehicle height $\hat{z}$ to be obtained (step S26). In contrasts, if the above-described difference is larger than the predetermined value (Step S25; No), the posture angle calculation unit 17 determines that the predicted vehicle height $z^-$ or the estimated vehicle height $z^{\wedge}$ at the preceding processing time is the predicted vehicle height $z^-$ or the estimated vehicle height $z^{\wedge}$ to be obtained (step S27). Furthermore, at step S27, the posture angle calculation unit 17 sets the voxel index idz of the own vehicle position road surface voxel selected at step S24 to "−1".

(6-3) Roll Angle/Pitch Angle Estimation Process

Figure 15:
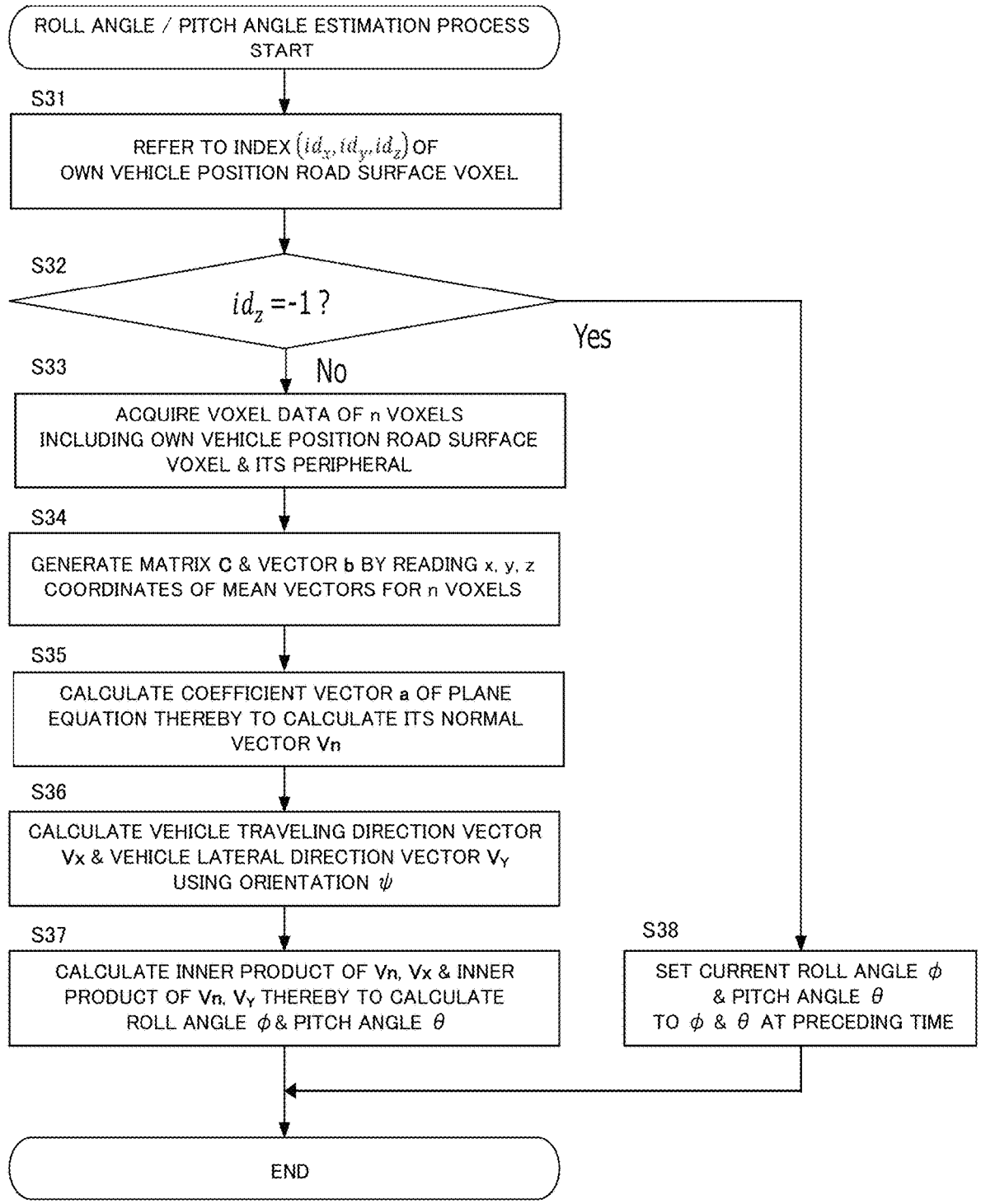
FIG. 15 is an example of a flowchart showing the procedure of the estimation process of the roll angle and pitch angle of the vehicle.

FIG. 15 is an example of a flowchart showing the procedure of the vehicle roll angle/pitch angle estimation process to be executed at step S13 and step S18 in FIG. 13. In FIG. 15, as an example, the in-vehicle device 1 estimates both the roll angle and the pitch angle of the vehicle, however, it may perform a process of estimating only one of the roll angle and the pitch angle of the vehicle.

First, the posture angle calculation unit 17 refers to the voxel index (idx, idy, idz) of the own vehicle position road surface voxel determined by the vehicle height estimation process at step S12 or step S17 executed immediately before (step S31). Then, the posture angle calculation unit 17 determines whether or not the voxel index idz of the own vehicle position road surface voxel is set to "−1" (step S32). If the voxel index idz of the own vehicle position road surface voxel is "−1" (step S32; Yes), the posture angle calculation unit 17 determines that the reliability of the target vehicle position road surface voxel is low or the own vehicle position road surface voxel cannot be detected. Therefore, in this case, the posture angle calculation unit 17 sets the roll angle $\varphi$ ($\varphi^-$ or $\varphi^{\wedge}$) or the pitch angle $\theta$ ($\theta^-$ or $\theta^{\wedge}$) at the current processing time to be obtained to the roll angle $\varphi$ ($\varphi^-$ or $\varphi^{\wedge}$) or the pitch angle $\theta$ ($\theta^-$ or $\theta^{\wedge}$) calculated at the preceding processing time (step S38).

On the other hand, if the voxel index idz of the own vehicle position road surface voxel is not "−1" (step S32; No), the posture angle calculation unit 17 acquires the voxel data VD of the n voxels around the own vehicle position road surface voxel including the own vehicle position road surface voxel (step S33). For example, the posture angle calculation unit 17 determines that voxels whose at least one of the voxel index idx or voxel index idy is different from the index of the own vehicle position road surface voxel and whose voxel index idz is the same or one difference as or from the index of the own vehicle position road surface voxel correspond to the n voxels described above together with the own vehicle position road surface voxel.

Then, the posture angle calculation unit 17 generates the matrix C and the vector b according to the equation (10) by reading the x, y, z coordinates of the mean vector included in the respective voxel data VD for the n voxels described above (step S34). Next, the posture angle calculation unit 17 calculates the coefficient vector a by the least squares method based on the equation (13), and specifies the normal vector Vn shown in the equation (15) (step S35). Then, using the yaw angle of the predicted or estimated vehicle (azimuth orientation) $\psi$ (i.e., $\psi^-$ or $\psi^{\wedge}$), the posture angle calculation unit 17 calculates the traveling direction vector $V_X$ shown in the equation (16) and the lateral direction vector $V_Y$ shown in the equation (19) (step S36). Thereafter, the posture angle calculation unit 17 calculates the inner product of the normal vector Vn and the traveling direction vector $V_X$ based on the equation (17) and calculates the inner product of the normal vector Vn and the lateral direction vector $V_Y$ based on the equation (20). Then, the posture angle calculation unit 17 calculates roll angle $\varphi$ ($\varphi^-$ or $\varphi^{\wedge}$) and pitch angle $\theta$ ($\theta^-$ or $\theta^{\wedge}$) to be determined at the current processing time (step S37).

(7) Experimental Example

The applicant ran a vehicle equipped with a lidar in the same manner as the configuration shown in FIG. 1 on a road including a hill with a large inclination, and performed the own vehicle position estimation based on NDT scan matching to collect the necessary data. The maximum ranging distance of the lidar mounted on the vehicle was 25 meters, and the horizontal angle range for performing ranging was around 120 degrees.

FIGS. 16A to 16E indicate the transition of the number of point cloud data, the number of associations, the association ratio, the evaluation value, and the pitch angle which were obtained on the above-mentioned road in the case of estimating the pitch angle and then performing the coordinate transformation of the point cloud data based on the estimated pitch angle. FIGS. 17A to 17E indicate the transition of the number of point cloud data, the number of associations, the association ratio, the evaluation value, and the pitch angle which were obtained on the above-mentioned road in the case of not estimating the pitch angle.

Figure 16A:
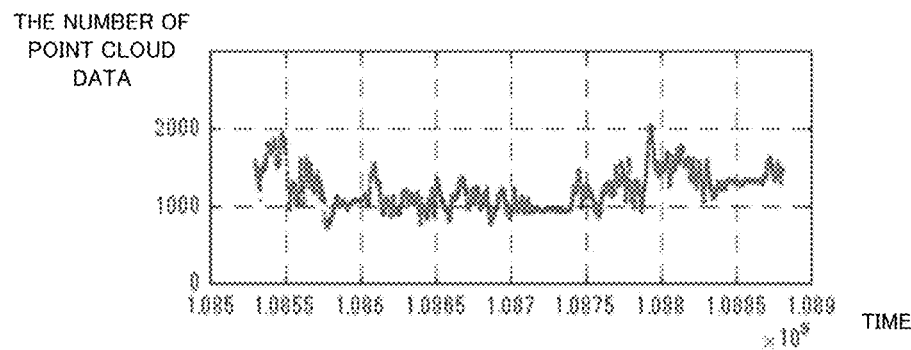
FIGS. 16A to 16E indicate the transition of the number of point cloud data, the number of associations, the association ratio, the evaluation value, and the pitch angle, respectively, in the case of estimating the pitch angle and performing the coordinate transformation of the point cloud data based on the estimated pitch angle.
Figure 16B:
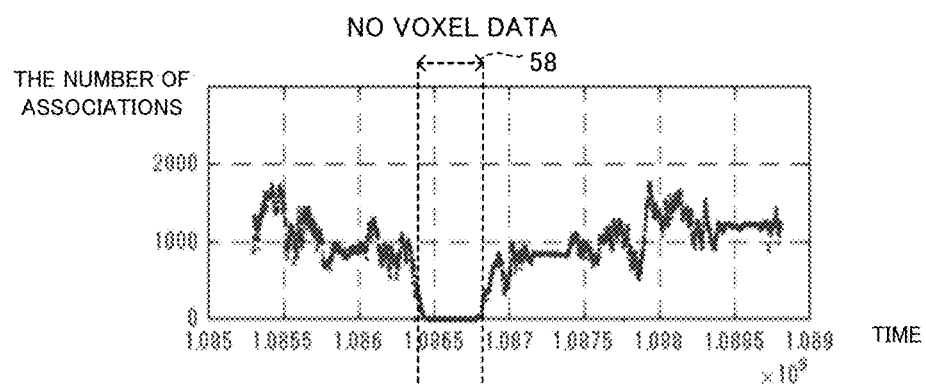
Figure 16C:
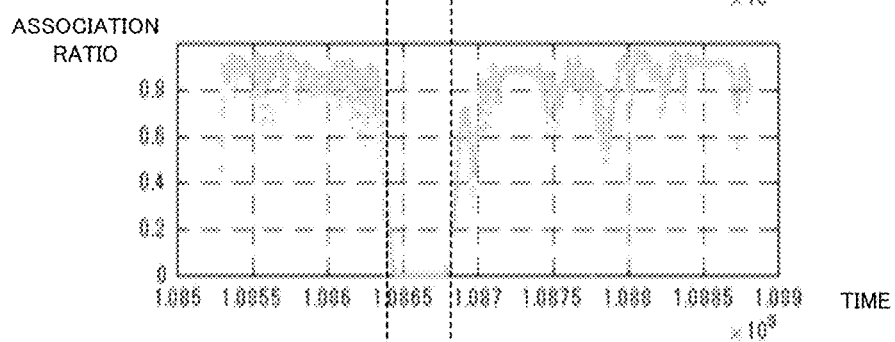
Figure 16D:
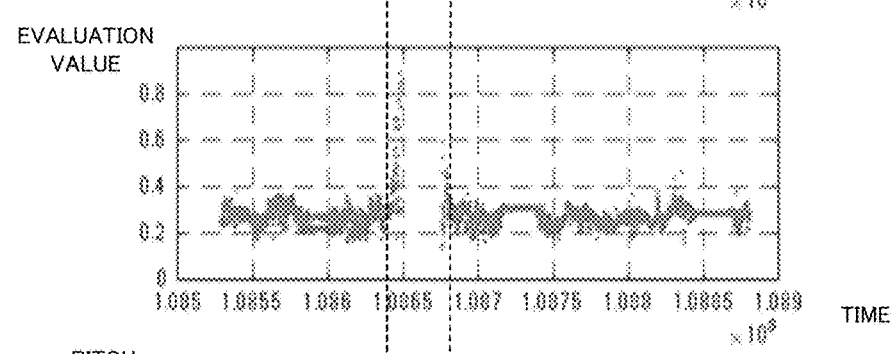

Here, "the number of point cloud data" indicates the number of measurement points of the point cloud data obtained from the lidar for each processing time, "the number of associations" indicates the number of measurement points associated with voxels. Further, "association ratio" indicates the ratio of the number of associations to the number of point cloud data, and "evaluation value" indicates the total evaluation function value corresponding to the estimated parameter determined in the NDT scan matching. Further, "pitch angle" indicates the pitch angle of the vehicle estimated by the vehicle. Since the estimation of the pitch angle is not performed in the case of FIG. 17A to 17E, the pitch angle shown in FIG. 17E is always 0 degrees. Further, the time period of the broken line arrow 58 in FIGS. 16B to 16E and the time period of the broken line arrow 59 in FIGS. 17B to 17E are the time period when the vehicle traveled on the road where the voxel data VD did not exist in the vicinity and therefore when the NDT scan matching had not been performed.

Figure 16E:
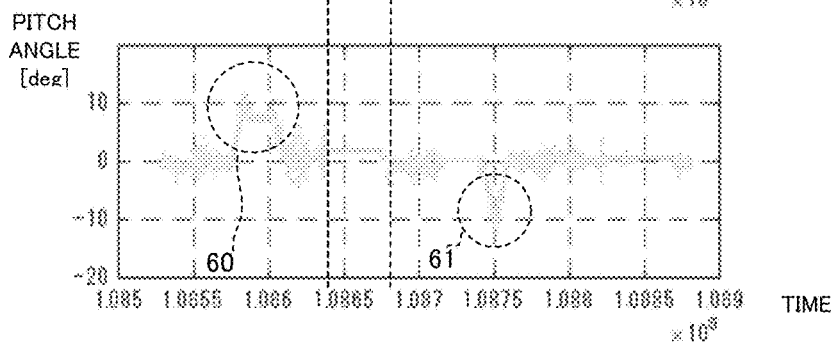

In FIG. 16E, in the time periods indicated by the broken line frame 60 and the broken line frame 61, the absolute value of the pitch angle is temporarily increased, and they correspond to the period in which the vehicle was traveling on a hill. Even in such a running period of a hill, as shown in FIG. 16C, the association ratio is equivalent to the association ratio in the running period of the other flat road since the decrease in the number of associations is suppressed by the coordinate transformation of the point cloud data considering the pitch angle.

Figure 17A:
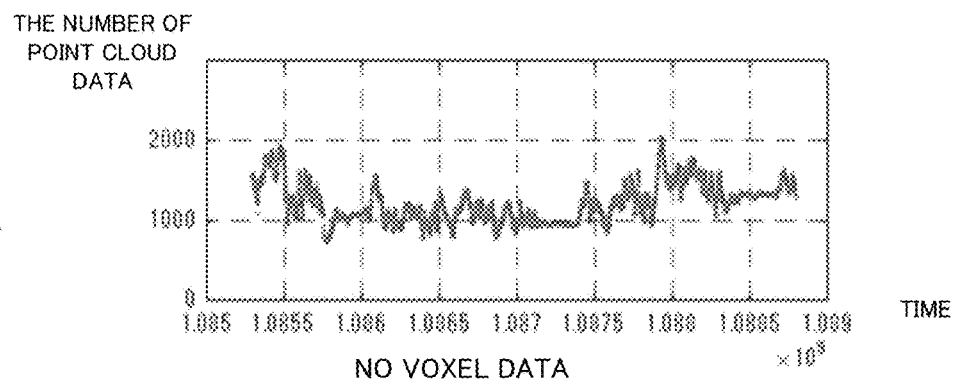
FIGS. 17A to 17E indicate the transition of the number of point cloud data, the number of associations, the association ratio, the evaluation value, and the pitch angle, respectively, in the case of not estimating the pitch angle.
Figure 17B:
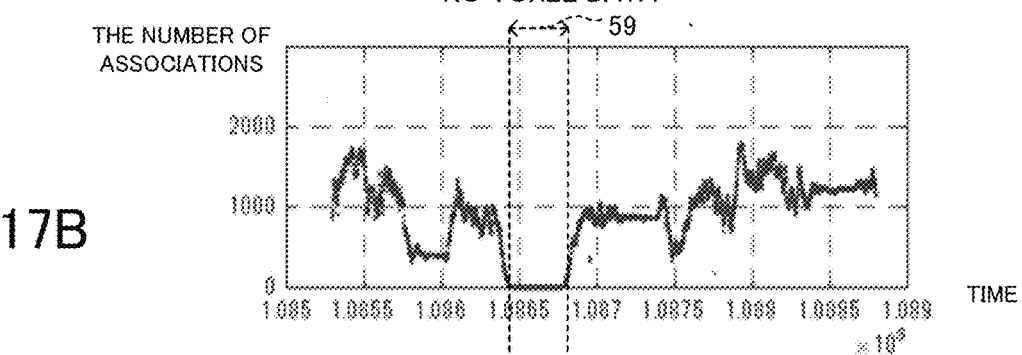
Figure 17C:
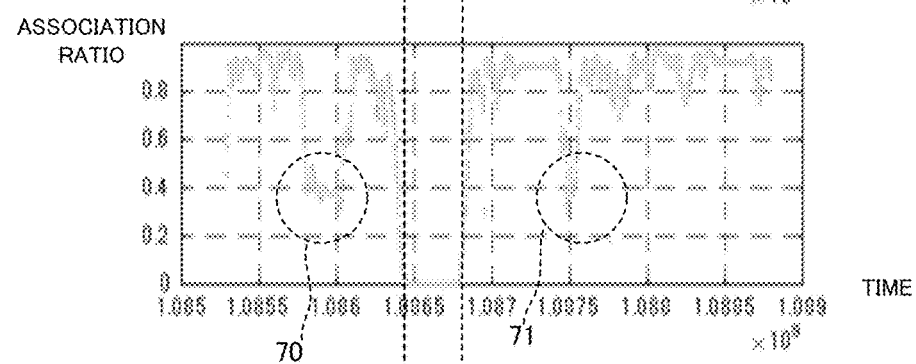
Figure 17D:
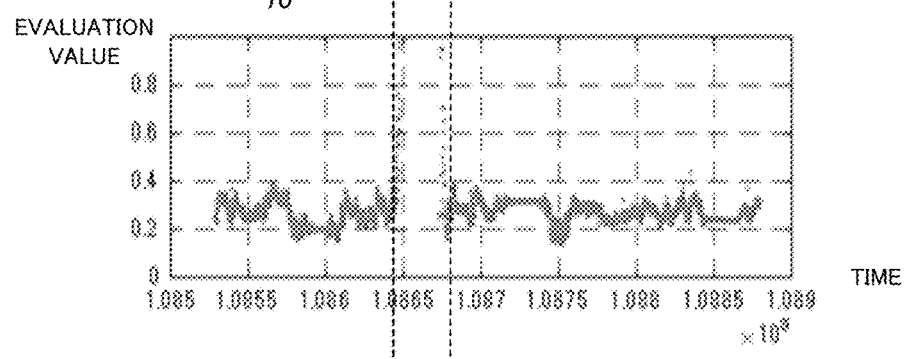
Figure 17E:
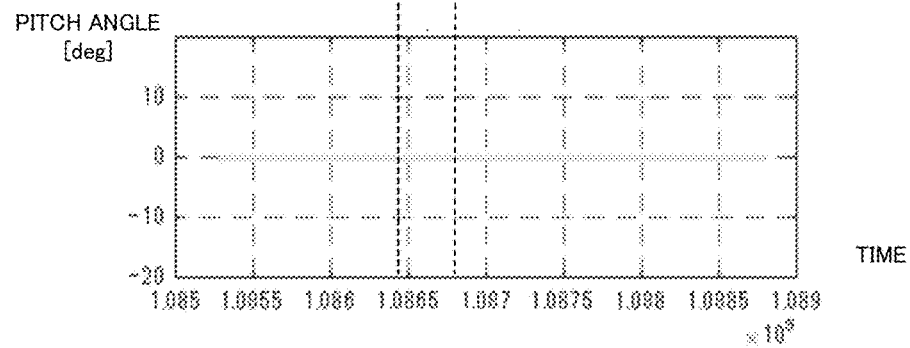

On the other hand, in the case of not performing the estimation of pitch angle and the coordinate transformation of the point cloud data based on the pitch angle, the association ratio corresponding to the time period when the vehicle was running on the above-described hill temporarily significantly decreases as shown in the broken line frame 70 and the broken line frame 71 in FIG. 17C. When a decrease in the number of associations and the association ratio has occurred, the robustness of NDT scan matching deteriorates, and it is inferred that the reliability of the estimated vehicle position is low.

Thus, according to this example, by performing the estimation of the pitch angle and the coordinate transformation of the point cloud data based on the pitch angle, it is possible to suitably suppress a decrease in the number of associations and the association ratio of the point cloud data even when running on a hill, thereby improving the robustness of the own vehicle position estimation based in the NDT scan matching. Similarly, by performing the estimation of the roll angle and the coordinate transformation of the point cloud data based on the roll angle, it is possible to suitably suppress the reduction of the number of associations and the association ratio of the point cloud data even when running on the road with a high cross slope, thereby improving robustness of the own vehicle position estimation based on the NDT scan matching.

As described above, the control unit 15 of the in-vehicle device 1 according to the present embodiment is configured to extract, from voxel data VD that is position information of an object for each of unit areas (voxels) into which a space is divided, the voxel data VD of plural voxels located at or around an own vehicle. Then, the control unit 15 is configured to calculate a normal vector of an approximate plane calculated based on the extracted voxel data VD of the plural voxels. Then, the control unit 15 is configured to calculate at least one of a pitch angle of the own vehicle or a roll angle of the own vehicle based on an orientation of the own vehicle and the normal vector. According to this mode, the in-vehicle device 1 can calculate at least one of the pitch angle or the roll angle with high accuracy, based on the voxel data VD.

(8) Modification

Hereinafter, a description will be given of a preferred modification to the embodiment described above. The following modifications may be applied to these embodiments in combination.
(First Modification)

In the flowchart in FIG. 13, the in-vehicle device 1 calculates the height of the vehicle (predicted vehicle height $z^-$ or estimated vehicle height $z\hat{}$) by performing the height estimation process of the vehicle shown in FIG. 14. However, the calculation method of the height of the vehicle is not limited thereto.

For example, the in-vehicle device 1 may further include the height of the vehicle in the estimation parameters in the in-vehicle position estimation based on the NDT scan matching. In this case, the in-vehicle device 1 performs the own vehicle position estimation in which the state variables of the own vehicle position are four variables (x, y, z, ψ) including not only the coordinates (x, y) and the yaw angle ψ shown in FIG. 3 but also the coordinate of the z-axis perpendicular to the x-axis and y-axis. According to this mode, the in-vehicle device 1 can also suitably estimate the height of the vehicle.
(Second Modification)

The in-vehicle device 1 may estimate the pitch angle or the roll angle of the vehicle based on the embodiment even when not performing NDT scan matching.

In this case, for example, in FIG. 13, the in-vehicle device 1 repeatedly executes the processes at step S11 to step S13 to repeatedly estimate at least one of the pitch angle or the roll angle of the vehicle based on the voxel data VD. Even in this case, the in-vehicle device 1 can use the estimated pitch angle or/and roll angle for various applications such as coordinate transformation of the output data of external sensor(s) such as the lidar 2 and hill (cant) detection processing.
(Third Modification)

The configuration of the driving support system shown in FIG. 1 is an example, and the configuration of the driving support system to which the present invention is applicable is not limited to the configuration shown in FIG. 1. For example, the driving support system may have, instead of having an in-vehicle device 1, the electronic control device of the vehicle executing the process to be executed by the posture angle calculation unit 17 and the NDT matching unit 18 of the in-vehicle device 1. In this case, the map DB 10 is stored in, for example, a storage unit in the vehicle or a server device configured to perform data communication with the vehicle, and the electronic controller of the vehicle estimates, by referring to the map DB 10, the roll angle and/or the pitch angle and the own vehicle position based on NDT scan matching.
(Fourth Modification)

The data structure of the voxel data VD is not limited to a data structure that includes a mean vector and a covariance matrix, as shown in FIG. 3. For example, the voxel data VD may include the point cloud data measured by the measurement maintenance vehicle to be used in calculating the mean vector and the covariance matrix as it is. In this case, for example, the in-vehicle device 1 refers to the voxel data VD and calculates the mean vector for each voxel to generate a matrix C shown in the equation (10).

Further, not only NDT scan matching but also other scan matching such as ICP (Iterative Closest Point) may be applied to the embodiment. Even in this case, in the same way as in the embodiment, the in-vehicle device 1 calculates the posture angle (pitch angle or/and roll angle) based on the embodiment, and performs the own vehicle position estimation relating to the planar position and the azimuth orientation by any scan matching.

While the present invention has been described with reference to the embodiments, the present invention is not limited to the above embodiments. Various changes that can be understood by those skilled in the art within the scope of the present invention can be made in the configuration and details of the present invention. In other words, it is needless to say that the present invention includes various modifications that could be made by a person skilled in the art according to the entire disclosure including the scope of the claims, and the technical philosophy. In addition, all patent and non-patent literatures mentioned in this specification are incorporated by reference in its entirety.

DESCRIPTION OF REFERENCE NUMERALS

1 In-vehicle device
2 Lidar
3 Gyroscope sensor
4 Vehicle velocity sensor
5 GPS receiver
10 Map DB

What is claimed is:
1. An information processing device comprising:
a processor coupled to a memory storing instructions to permit the processor to function as:
an extraction unit configured to extract, from voxel data in an absolute coordinate system which represents statistical position data of stationary structures in each voxel, the voxel data of plural voxels located at or around a moving body, based on a predicted or estimated position in the absolute coordinate system of the moving body;
a normal vector calculation unit configured to calculate a normal vector of an approximate plane calculated based on the extracted voxel data of the plural voxels;
an angle calculation unit configured to calculate at least one of a pitch angle of the moving body or a roll angle of the moving body based on an orientation of the moving body and the normal vector; and a position estimation unit configured to perform position estimation of the moving body through matching for each of the voxels which associates the voxel data corresponding to an object having a height measured by a measurement unit with data obtained by a coordinate transformation of measurement data of the object based on at least one of the pitch angle or the roll angle into the absolute coordinate system, the measurement data being outputted by the measurement unit mounted on the moving body, wherein, based on an estimation result of the position estimation of the moving body, the moving body performs autonomous driving control to travel along a route.

2. The information processing device according to claim 1, wherein the angle calculation unit calculates the pitch angle based on an inner product of the normal vector and a vector indicative of the orientation of a travelling direction of the moving body on a horizontal plane.

3. The information processing device according to claim 1, wherein the angle calculation unit calculates the roll angle based on an inner product of the normal vector and a vector indicative of the orientation of a lateral direction of the moving body on a horizontal plane.

4. The information processing device according to claim 1, wherein the voxel data of the object for each of the voxels includes information indicative of a mean vector of the position of the object for each of the voxels, and wherein the normal vector calculation unit calculates the normal vector based on the coordinates of the mean vector for each of the plural voxels.

5. The information processing device according to claim 1, wherein the extracting unit extracts the voxel data corresponding to a first voxel overlapping with the position of the moving body and second voxels adjacent to the first voxel, the first voxel and the second voxels being selected from voxels which have the voxel data of the object.

6. The information processing device according to claim 5, wherein the processor is further configured to function as:

a height calculation unit configured to calculate a height of the moving body from a reference position based on the voxel data of the first voxel and information indicative of a height of the moving body from a road surface.

7. The information processing device according to claim 1, wherein the voxel data is voxel data of a stationary structure including a road surface, and wherein the extracting unit extracts voxel data of the road surface included in the plural voxels from map data including the voxel data of the object for each of the voxels.

8. The information processing device according to claim 1, wherein the normal vector calculation unit is configured to calculate the normal vector if there are three or more pieces of the voxel data at or around the moving body.

9. The information processing device according to claim 1, wherein the normal vector calculation unit is configured to:

calculate, by a least squares method, an equation of an approximate plane; and calculate the normal vector from a coefficient vector of the equation.

10. A control method executed by an information processing device, the control method comprising:

extracting, from voxel data in an absolute coordinate system which represents statistical position data of stationary structures in each voxel, the voxel data of plural voxels located at or around a moving body, based on a predicted or estimated position in the absolute coordinate system of the moving body;

calculating a normal vector of an approximate plane calculated based on the extracted voxel data of the plural voxels;

calculating at least one of a pitch angle of the moving body or a roll angle of the moving body based on an orientation of the moving body and the normal vector; and performing position estimation of the moving body through matching for each of the voxels which associates the voxel data corresponding to an object having a height measured by a measurement unit with data obtained by a coordinate transformation of measurement data of the object based on at least one of the pitch angle or the roll angle into the absolute coordinate system, the measurement data being outputted by the measurement unit mounted on the moving body, wherein, based on an estimation result of the position estimation of the moving body, the moving body performs autonomous driving control to travel along a route.

11. A non-transitory computer readable medium including instructions executed by a computer, the instructions comprising:

extracting, from voxel data in an absolute coordinate system which represents statistical position data of stationary structures in each voxel, the voxel data of plural voxels located at or around a moving body, based on a predicted or estimated position in the absolute coordinate system of the moving body;

calculating a normal vector of an approximate plane calculated based on the extracted voxel data of the plural voxels;

calculating at least one of a pitch angle of the moving body or a roll angle of the moving body based on an orientation of the moving body and the normal vector; and performing position estimation of the moving body through matching for each of the voxels which associates the voxel data corresponding to an object having a height measured by a measurement unit with data obtained by a coordinate transformation of measurement data of the object based on at least one of the pitch angle or the roll angle into the absolute coordinate system, the measurement data being outputted by the measurement unit mounted on the moving body, wherein, based on an estimation result of the position estimation of the moving body, the moving body performs autonomous driving control to travel along a route.

* * * * *